(12) United States Patent
Gopal et al.

(10) Patent No.: US 11,997,616 B2
(45) Date of Patent: May 28, 2024

(54) METHODS AND APPARATUS TO FACILITATE MANAGING MULTI-SIM CONCURRENT MODE FOR CO-BANDED OR SPECTRUM OVERLAP CARRIERS

(71) Applicant: QUALCOMM Incorporated, San Diego, CA (US)

(72) Inventors: Thawatt Gopal, San Diego, CA (US); Qingxin Chen, San Diego, CA (US); Reza Shahidi, San Diego, CA (US); Francesco Gatta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,367

(22) Filed: Jun. 18, 2021

(65) Prior Publication Data

US 2021/0400599 A1    Dec. 23, 2021

Related U.S. Application Data

(60) Provisional application No. 63/042,499, filed on Jun. 22, 2020.

(51) Int. Cl.
*H04W 52/34* (2009.01)
*H04W 52/14* (2009.01)

(52) U.S. Cl.
CPC ....... *H04W 52/346* (2013.01); *H04W 52/146* (2013.01)

(58) Field of Classification Search
CPC .......................... H04W 52/146; H04W 52/346
See application file for complete search history.

(56) References Cited

U.S. PATENT DOCUMENTS 8,526,946 B2   9/2013 Pattaswamy et al.
9,137,687 B2   9/2015 Gottimukkala et al.
(Continued)

FOREIGN PATENT DOCUMENTS

CN   110692263 A   1/2020
CN   113423106 A   9/2021
(Continued)

OTHER PUBLICATIONS

International Search Report and Written Opinion—PCT/US2021/038298—ISA/EPO—dated Oct. 7, 2021.
(Continued)

*Primary Examiner* — Raymond S Dean
(74) *Attorney, Agent, or Firm* — Dalei Dong; ArentFox Schiff LLP

(57) ABSTRACT

Apparatus, methods, and computer-readable media for facilitating managing multi-SIM concurrent mode for TDD co-banded or spectrum overlap carriers are disclosed herein. An example method for wireless communication at a user equipment (UE) includes estimating a maximum transmit power for a first subscriber based on a low-noise amplifier (LNA) input power threshold associated with an active receive chain of a second subscriber, where the UE comprises the first subscriber and the second subscriber. The example method also includes transmitting, via an active transmit chain of the first subscriber, an uplink transmission at the first subscriber maximum transmit power based on the first subscriber and the second subscriber operating concurrently, and a transmit power associated with the uplink transmission being greater than the first subscriber maximum transmit power.

30 Claims, 12 Drawing Sheets

(56) References Cited

U.S. PATENT DOCUMENTS

| | | |
|---|---|---|
| 10,187,781 B2 | 1/2019 | Kumar et al. |
| 10,980,001 B2 | 4/2021 | Huang et al. |
| 11,558,733 B2 | 1/2023 | Baskar et al. |
| 2012/0264473 A1 | 10/2012 | Mujtaba et al. |
| 2014/0200046 A1 | 7/2014 | Sikri et al. |
| 2014/0213210 A1 | 7/2014 | Li et al. |
| 2014/0228039 A1 | 8/2014 | Zhao et al. |
| 2014/0370892 A1 | 12/2014 | Gottimukkala et al. |
| 2015/0011236 A1 | 1/2015 | Kazmi et al. |
| 2015/0071088 A1 | 3/2015 | Gottimukkala et al. |
| 2015/0304963 A1 | 10/2015 | Mitra et al. |
| 2015/0381291 A1 | 12/2015 | Mahajan et al. |
| 2016/0049976 A1 | 2/2016 | Krishnamoorthi et al. |
| 2016/0099684 A1 | 4/2016 | Qiu et al. |
| 2016/0134317 A1 | 5/2016 | Hu et al. |
| 2016/0278128 A1 | 9/2016 | Krishnamurthy |
| 2016/0330653 A1* | 11/2016 | Yang ................ H04W 36/0016 |
| 2017/0026876 A1* | 1/2017 | Yang ........................ H04L 5/14 |
| 2017/0180550 A1* | 6/2017 | Geo ..................... H04M 7/0042 |
| 2017/0208494 A1* | 7/2017 | Moon ................... H04L 5/0048 |
| 2017/0223313 A1* | 8/2017 | Chong .................. H04W 76/10 |
| 2017/0223589 A1 | 8/2017 | Lee et al. |
| 2018/0084601 A1* | 3/2018 | Dhanapal ............. H04W 76/30 |
| 2018/0176887 A1 | 6/2018 | Strobl |
| 2018/0184309 A1 | 6/2018 | Bhardwaj et al. |
| 2018/0234878 A1 | 8/2018 | Anand et al. |
| 2018/0234916 A1* | 8/2018 | Song ..................... H04W 48/18 |
| 2018/0242192 A1* | 8/2018 | Zhao ..................... H04W 80/00 |
| 2018/0270649 A1* | 9/2018 | Tsai ....................... H04W 8/205 |
| 2018/0338284 A1 | 11/2018 | Maheshwari et al. |
| 2019/0199413 A1 | 6/2019 | Sundararajan et al. |
| 2019/0364492 A1 | 11/2019 | Azizi et al. |
| 2021/0029773 A1 | 1/2021 | Majumder et al. |
| 2022/0232367 A1 | 7/2022 | Gopal et al. |
| 2022/0295543 A1 | 9/2022 | Shahidi et al. |
| 2023/0078016 A1 | 3/2023 | Gopal et al. |
| 2023/0370833 A1 | 11/2023 | Zhang |

FOREIGN PATENT DOCUMENTS

| | | |
|---|---|---|
| EP | 2302973 A1 | 3/2011 |
| EP | 2515593 A2 | 10/2012 |
| WO | 2015160457 | 10/2015 |
| WO | WO-2016122773 A1 | 8/2016 |
| WO | 2020247043 A1 | 12/2020 |

OTHER PUBLICATIONS

Jung G., et al., "Performance Improvements of Universal Mobile Telecommunications System Enhanced Uplink Using Mitigation Scheme in Single Tx and Dual Rx Dual-SIM Dual-Active Devices", IET, Electronics Letters, vol. 51, No. 25, pp. 2160-2162, Dec. 10, 2015, 2 pages.

* cited by examiner

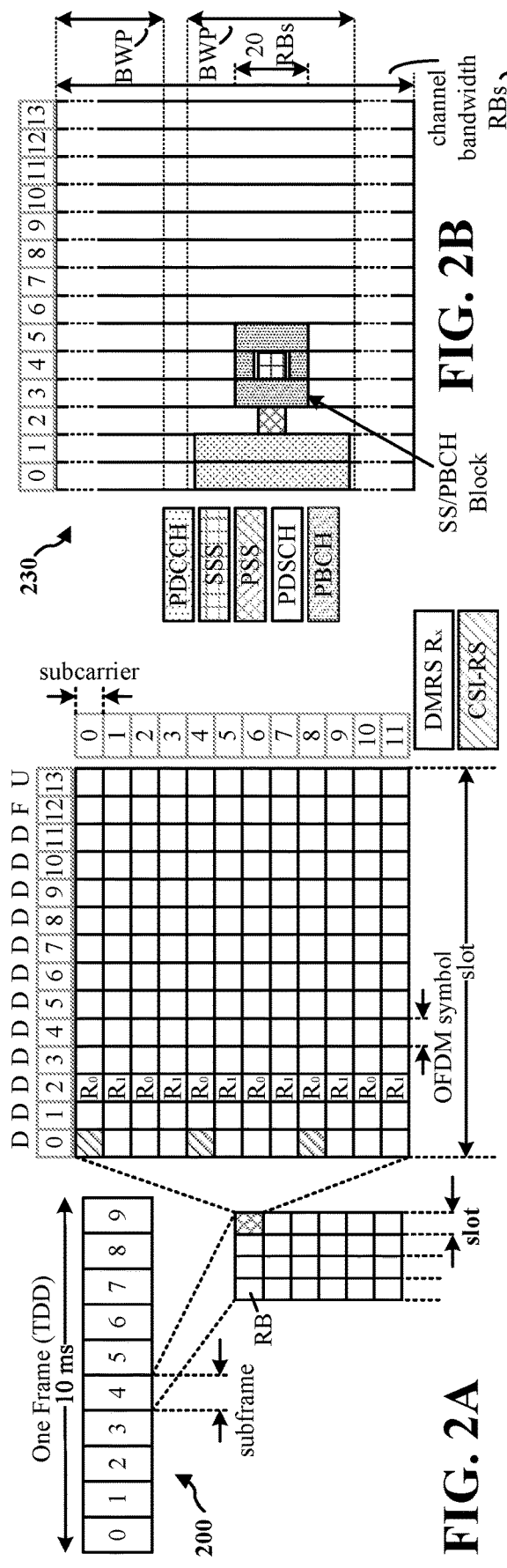
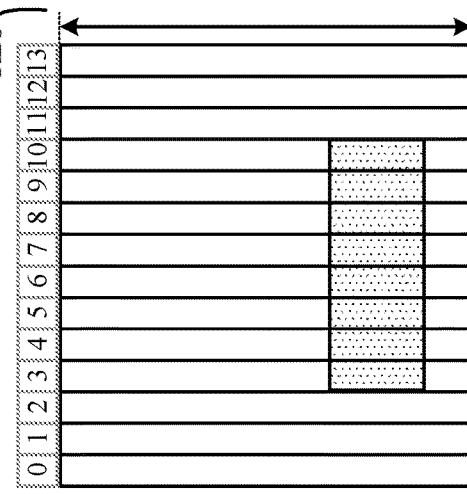
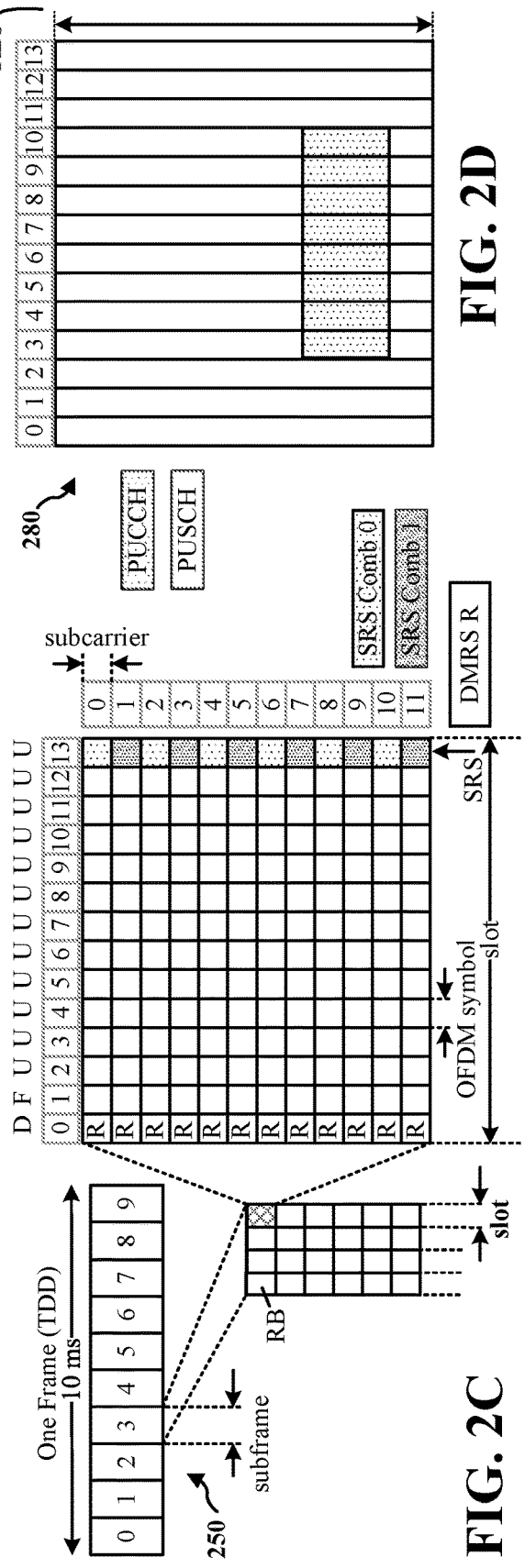
FIG. 2A
FIG. 2B
FIG. 2C
FIG. 2D

METHODS AND APPARATUS TO FACILITATE MANAGING MULTI-SIM CONCURRENT MODE FOR CO-BANDED OR SPECTRUM OVERLAP CARRIERS

CROSS-REFERENCE TO RELATED APPLICATION

This application claims the benefit of, and right of priority to, U.S. Provisional Application No. 63/042,499, filed Jun. 22, 2020 and entitled "Methods and Apparatus to Facilitate Managing Multi-SIM Concurrent Mode for Co-Banded or Spectrum Overlap Carriers", the contents of which are hereby incorporated by reference as if fully set forth herein.

BACKGROUND

Technical Field

The present disclosure relates generally to communication systems, and more particularly, to wireless communication including multiple subscriber identity module (MSIM) user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus estimates a maximum transmit power for a first subscriber based on a low-noise amplifier (LNA) input power threshold associated with an active receive chain of a second subscriber, and where the UE comprises the first subscriber and the second subscriber. The apparatus also transmits, via an active transmit chain of the first subscriber, an uplink transmission at the first subscriber maximum transmit power based on the first subscriber and the second subscriber operating concurrently, and a transmit power associated with the uplink transmission being greater than the first subscriber maximum transmit power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
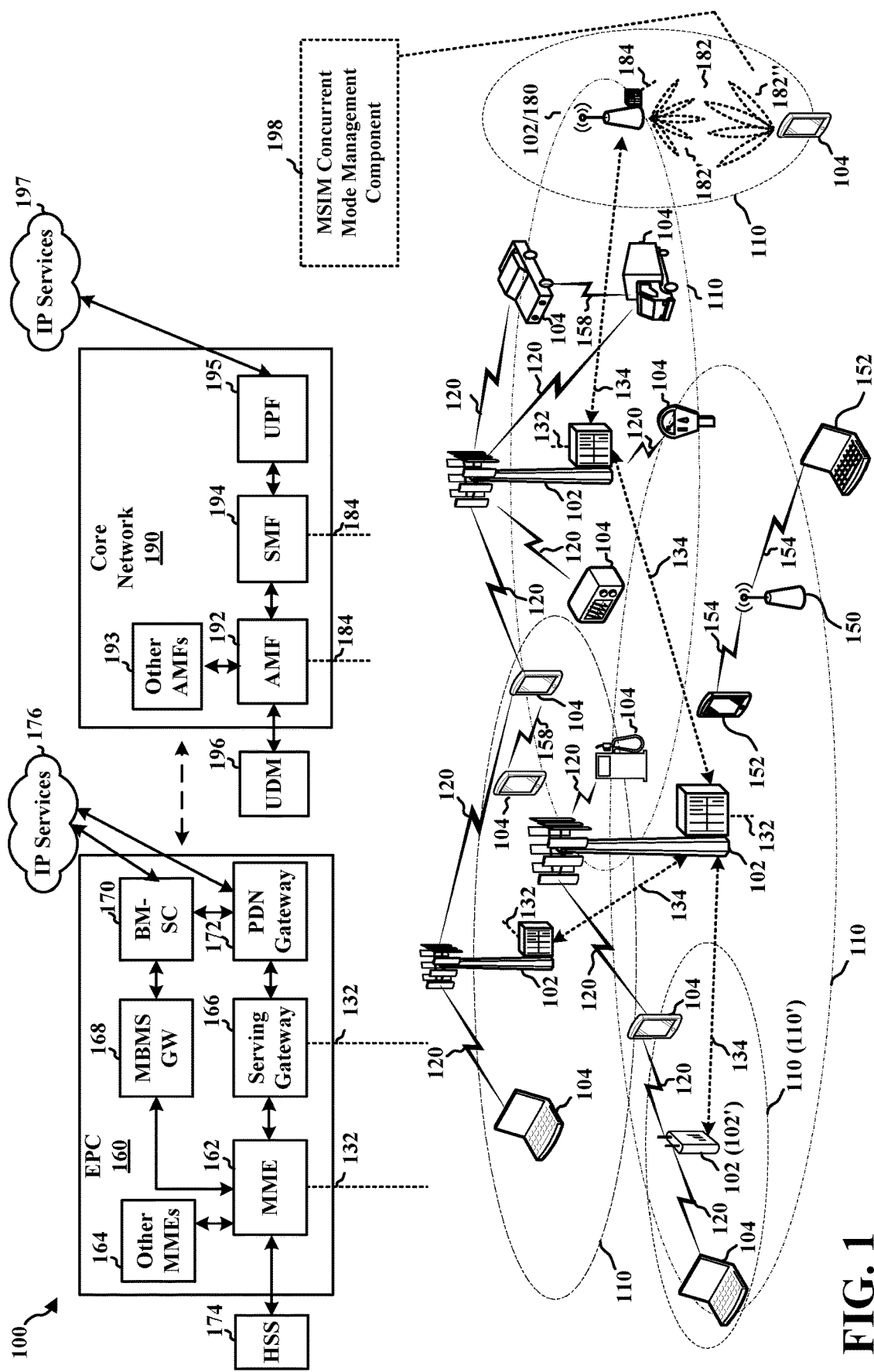
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A user equipment (UE) may include one or more SIMS that provide access to multiple separate mobile communication networks (or carriers). Each SIM (sometimes referred to as a "SIM card" or a "subscriber") may be associated with a different service provider subscription, enabling the multi-SIM (MSIM) UE to communicate with one or more communication networks. Each SIM or subscription may also be associated with a respective radio access technology (RAT). For example, an MSIM UE may comprise a first SIM configured to facilitate 5G NR communications and a second SIM configured to facilitate LTE communications.

In some examples, an MSIM UE may be configured to enable concurrent operation of at least two SIMS. For example, a first SIM of the MSIM UE may include transmission activity and a second SIM of the MSIM UE may include reception activity. Additionally, in some examples, it may be possible for the first SIM and the second SIM to employ time division duplexing (TDD) and be either co-banded or overlap in spectrum. For example, the first SIM and the second SIM may be configured to operate in different frequency parts of a same band (e.g., co-banded) or may be configured to operate in different bands that comprise operating spectrum overlap. In some examples, it may be possible for the first SIM to employ TDD and the second SIM to employ FDD and overlap in spectrum. In such examples in which the SIMS are co-banded or overlap in spectrum, it may be possible that a portion of the transmit power used to transmit a communication (e.g., an uplink transmission) using the first SIM may be received as input power at an LNA of a receive chain of the second SIM.

Aspects presented herein enable an MSIM UE, such as a UE 104, to estimate a maximum transmit power for transmitting an uplink transmission based on a configuration of the MSIM UE. For example, techniques disclosed herein may estimate the maximum transmit power based on a relationship between an LNA input power threshold, an antenna isolation factor associated with an active transmit chain of a first SIM and an active receive chain of a second SIM, a front-end loss factor associated with the active receive chain, and/or a peak-to-average power ratio. In some examples, the MSIM UE may monitor for an occurrence of an MSIM concurrent mode management triggering event based on an operating band and operating mode of the first SIM and the second SIM of the MSIM UE. For example, disclosed techniques may determine that the respective operating bands of the first SIM and the second SIM indicate that the operating bands are co-banded or overlap in spectrum. Additionally, disclosed techniques may determine that the first SIM is operating in a connected mode comprising at least one active transmit chain and that the second SIM is operating in an idle mode comprising at least one receive chain. In some examples, when an occurrence of an MSIM concurrent mode management triggering event is detected, the MSIM UE may adjust a target transmit power to transmit an uplink transmission. Disclosed techniques may then transmit the uplink transmission based on the target transmit power and the estimated maximum transmit power. For example, disclosed techniques may transmit the uplink transmission based on the target transmit power when the target transmit power is less than (or equal to) the estimated maximum transmit power. Otherwise, disclosed techniques may transmit the uplink transmission based on the estimated maximum transmit power when the target transmit power is greater than the estimated maximum power.

By determining the maximum transmit power and limiting the transmit power of uplink transmissions based on the maximum transmit power, disclosed techniques may limit the amount of transmit power associated with the uplink transmission that may be received as input power at an LNA of a receive chain of the second SIM. For example, disclosed techniques enable limiting the amount of transmit power of the active transmit chain to a level so that input power received at the LNA of the receive chain does not cause LNA damage or cause LNA reliability issues.

In some examples, a wireless communication device, such as a UE 104, may be configured to manage one or more aspects of wireless communication by determining a maximum transmit power for a transmit chain of an MSIM UE operating in a concurrent mode. As an example, in FIG. 1, the UE 104 may include an MSIM concurrent mode management component 198. The example MSIM concurrent mode management component 198 may be configured to estimate a maximum transmit power for a first subscriber based on an LNA input power threshold associated with an active receive chain of a second subscriber. In some examples, the UE comprises the first subscriber (e.g. a first SIM) and the second subscriber (e.g. a second SIM). The example MSIM concurrent mode management component 198 may also be configured to transmit, via an active transmit chain of the first subscriber, an uplink transmission at the first subscriber maximum transmit power based on the first subscriber and the second subscriber operating concurrently, and a transmit power associated with the uplink transmission being greater than the first subscriber maximum transmit power.

Although the following description provides examples directed to an MSIM UE comprising a first SIM (or subscriber) and a second SIM (or subscriber), the concepts described herein may be applicable to any suitable quantity of SIMS, such as three SIMS, four SIMS, etc. Furthermore, while the following description provides examples directed to 5G NR and LTE SIMs, the concepts described herein may be applicable to other similar areas, such as LTE, LTE-A, CDMA, GSM, and/or other wireless technologies, in which an MSIM UE may select a transmit power for an uplink transmission during concurrent operation of at least two SIMS of the MSIM UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\infty=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
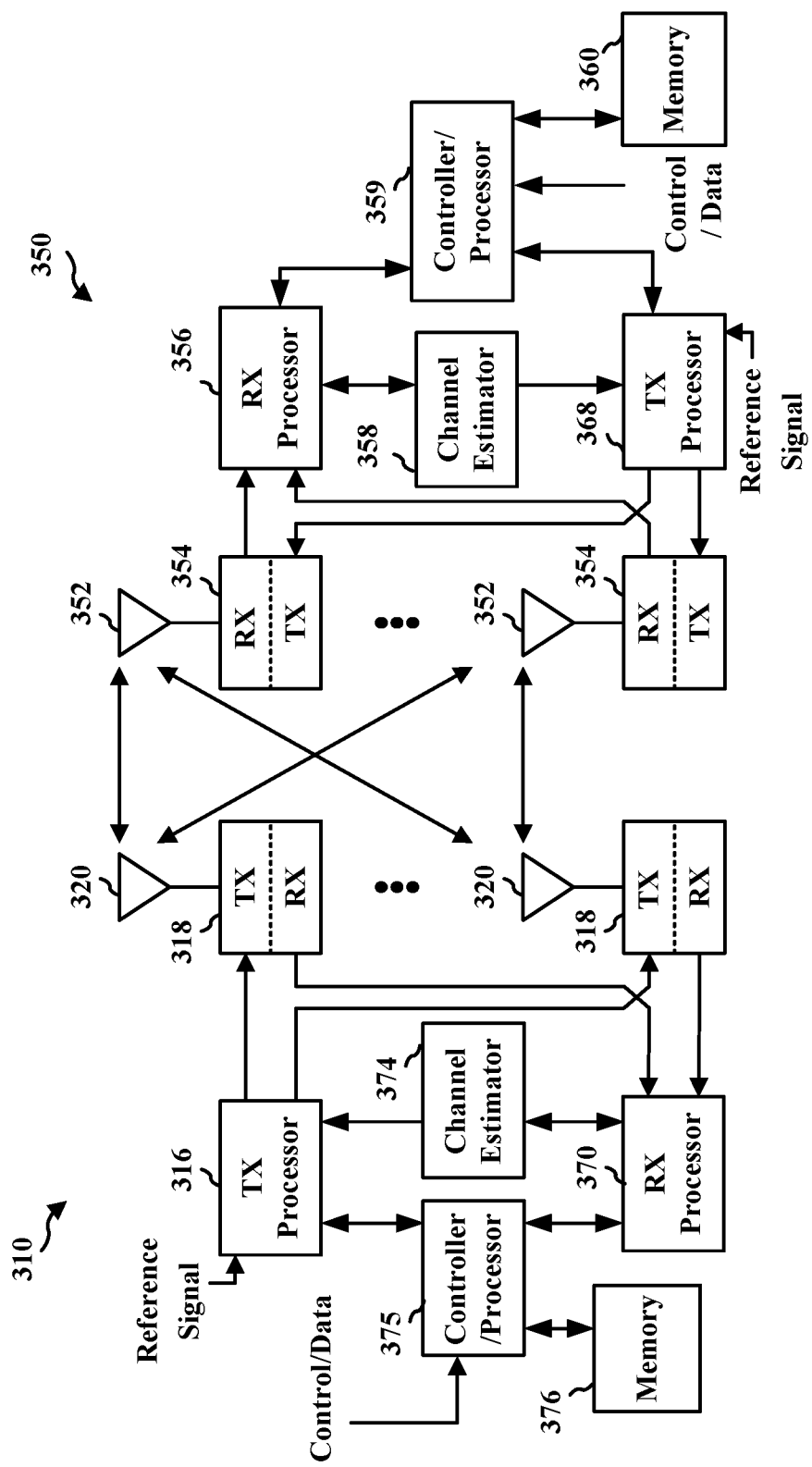
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the MSIM concurrent mode management component 198 of FIG. 1.

A UE may include one or more SIMS that provide access to multiple separate mobile communication networks (or carriers). Each SIM may be associated with a different service provider subscription, enabling the MSIM UE to communicate with one or more communication networks. Each SIM or subscription may also be associated with a respective RAT. For example, an MSIM UE may comprise a first SIM configured to facilitate 5G NR communications and a second SIM configured to facilitate LTE communications.

In some examples, an MSIM UE may be configured to enable concurrent operation of at least two SIMs. For example, the first SIM of the MSIM UE may include transmission activity and the second SIM of the MSIM UE may include reception activity. Additionally, in some examples, it may be possible for the first SIM and the second SIM to employ time division duplexing (TDD) and be either co-banded or overlap in spectrum. Additionally or alternatively, it may be possible for the first SIM to employ TDD and the second SIM to employ FDD and overlap in spectrum. As used herein, the first SIM and the second SIM may be referred to as "co-banded" when the first SIM and the second SIM are configured to operate in different frequency parts of a same band. As used herein, the first SIM and the second SIM may be referred to as operating with "spectrum overlap" when the first SIM and the second SIM are configured to operate in different bands that comprise operating spectrum overlap.

Figures 4A, 4B:
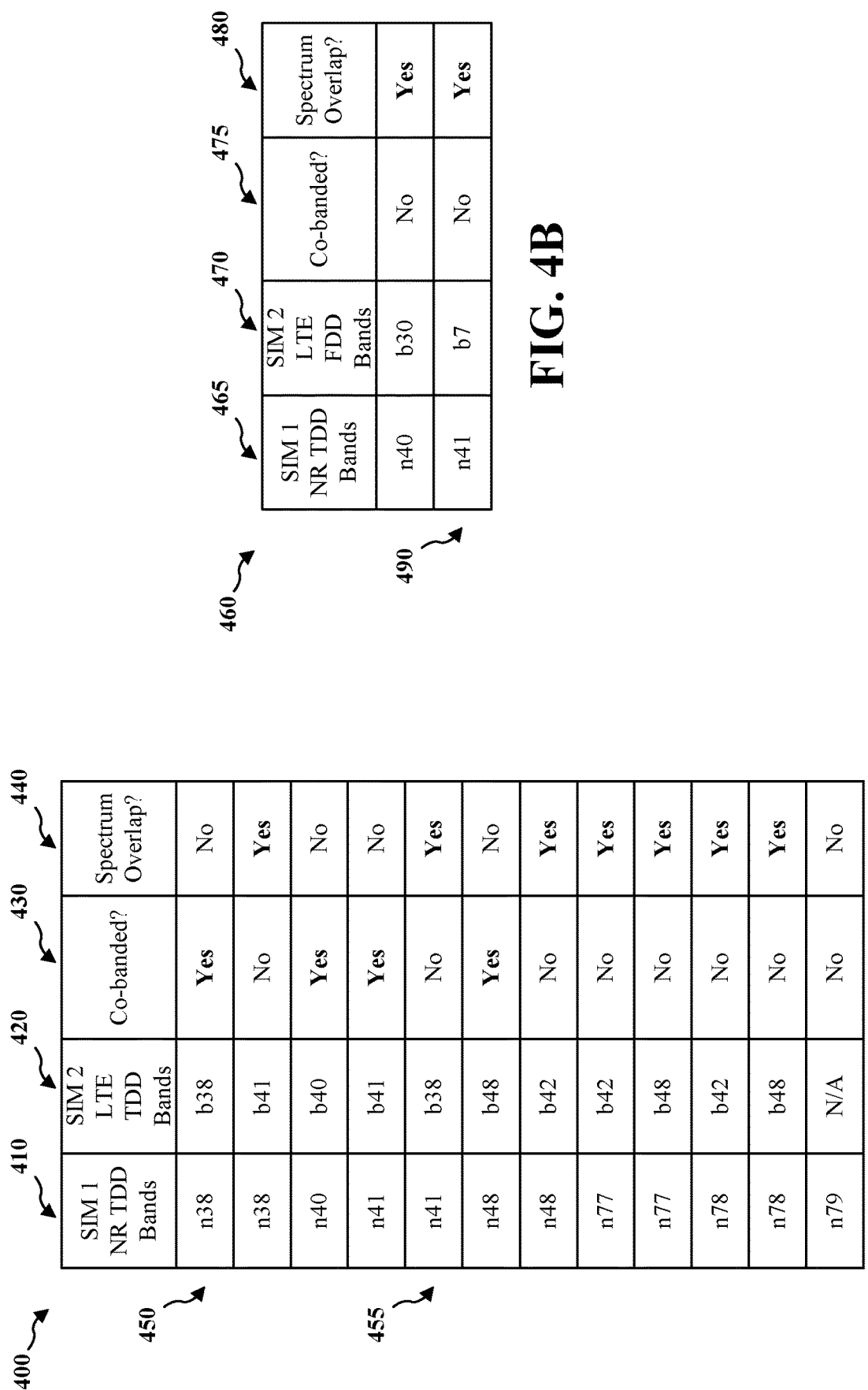
FIG. 4A illustrates an example RF band analysis table of a first SIM supporting time division duplexing (TDD) and a second SIM supporting TDD, in accordance with various aspects of the present disclosure.
FIG. 4B illustrates an example RF band analysis table of a first SIM supporting TDD and a second SIM supporting frequency division duplexing (FDD), in accordance with various aspects of the present disclosure.

FIG. 4A illustrates an example RF band analysis table 400, as presented herein. The example table 400 includes a first SIM ("SIM1") NR TDD band identifying column 410, a second SIM ("SIM2") LTE TDD band identifying column 420, a co-banded identifying column 430, and a spectrum overlap identifying column 440. The example first SIM NR TDD band identifying column 410 identifies different NR TDD bands available to the first SIM. The example second SIM LTE TDD band identifying column 420 identifies different LTE TDD bands available to the second SIM. The example co-banded identifying column 430 indicates when the combination of bands of the first SIM and the second SIM are co-banded. The example spectrum overlap identifying column 440 indicates when the combination of bands of the first SIM and the second SIM are overlapping in spectrum.

As described above, the first SIM and the second SIM are co-banded when the operating bands of the first SIM and the second SIM are the same band. For example, a first row 450 of the table 400 indicates that the first SIM is configured to operate in the "n38" NR TDD band and that the second SIM is configured to operate in the "b38" LTE TDD band. As the combination of bands of the first SIM (n38) and the second SIM (b38) is the same band 38, the co-banded identifying column 430 of the first row 450 indicates that the first SIM and the second SIM are co-banded. It may be appreciated that while the first SIM and the second SIM are operating in the same band, they may be operating in different frequency regions of the band.

The first SIM and the second SIM may be overlapping in spectrum when the first SIM and the second SIM are configured to operate in different bands that include at least a portion of spectrum that overlaps. For example, a second row 455 of the table 400 indicates that the first SIM is configured to operate in the "n41" NR TDD band and that the second SIM is configured to operate in the "b38" LTE TDD band. As the combination of bands of the first SIM (n41) and the second SIM (b38) are not the same, the first SIM and the second SIM are not co-banded. However, as bands comprise a range of frequencies, it may be possible that different bands overlap in spectrum. For example, the b38 band comprises a 50 MHz bandwidth that ranges from 2570 MHz to 2620 MHz, and the n41 band comprises a 194 MHz bandwidth that ranges from 2496 MHz to 2690 MHz. Thus, it may be possible for the combination of bands of the first SIM and the second SIM of the second row 455 to overlap in spectrum and, thus, the spectrum overlap identifying column 440 of the second row 455 indicates spectrum overlap.

It may be appreciated that the example combinations of TDD bands of the table 400 of FIG. 4A are illustrative and not limiting. Moreover, it may be appreciated that, in some examples, a SIM may be configured to operate in a subset of the spectrum associated with a band. For example, while the first SIM may be configured to operate in the n41 band, the first SIM may also be configured to operate in a portion of the available 194 MHz bandwidth. In some such examples, it may be possible for the first SIM and the second SIM of the second row 455 to not overlap in spectrum. For example, the first SIM may be configured to operate in the 2496 MHz to 2570 MHz range of the n41 band or the 2620 MHz to 2690 MHz range of the n41 band. In such examples, the first SIM and the second SIM may not overlap in spectrum.

FIG. 4B illustrates an example RF band analysis table 460, as presented herein. The example table 460 includes a first SIM ("SIM1") NR TDD band identifying column 465, a second SIM ("SIM2") LTE FDD band identifying column 470, a co-banded identifying column 475, and a spectrum overlap identifying column 480. The example first SIM NR TDD band identifying column 465 identifies different NR TDD bands available to the first SIM. The example second SIM LTE FDD band identifying column 470 identifies different LTE TDD bands available to the second SIM. The example co-banded identifying column 475 indicates when the combination of bands of the first SIM and the second SIM are co-banded. The example spectrum overlap identifying column 480 indicates when the combination of bands of the first SIM and the second SIM are overlapping in spectrum.

As described above, the first SIM and the second SIM may be overlapping in spectrum when the first SIM and the second SIM are configured to operate in different bands that include at least a portion of spectrum that overlaps. For example, a row 490 of the table 460 indicates that the first SIM is configured to operate in the "n41" NR TDD band and that the second SIM is configured to operate in the "b7" LTE FDD band. As the combination of bands of the first SIM (n41) and the second SIM (b7) are not the same, the first SIM and the second SIM are not co-banded. However, as bands comprise a range of frequencies, it may be possible that different bands overlap in spectrum. For example, the n41 band comprises a 194 MHz bandwidth that ranges from 2496 MHz to 2690 MHz, and the b7 band comprises a 190 MHz bandwidth that ranges from 2500 MHz to 2690 MHz. Thus, it may be possible for the combination of bands of the first SIM and the second SIM of the row 490 to overlap in spectrum and, thus, the spectrum overlap identifying column 480 of the row 490 indicates spectrum overlap.

It may be appreciated that the example combinations of TDD and FDD bands of the table 460 of FIG. 4B are illustrative and not limiting. Moreover, it may be appreciated that, in some examples, a SIM may be configured to operate in a subset of the spectrum associated with a band. For example, while the first SIM may be configured to operate in the band n41, the first SIM may also be configured to operate in a portion of the available 194 MHz bandwidth. In some such examples, it may be possible for the first SIM and the second SIM of the row 490 to not overlap in spectrum. For example, the first SIM may be configured to operate in the 2496 MHz to 2500 MHz range of the n41. In such examples, the first SIM and the second SIM may not overlap in spectrum.

Although not shown in the illustrated example of FIG. 4B, it may be possible that in some examples, the first SIM and the second SIM may be co-banded when the operating bands of the first SIM and the second SIM are the same band.

It may be appreciated that an MSIM UE may operate in a concurrent mode or a non-concurrent mode based on whether the respective SIMS of the MSIM UE are in a connected mode, an idle mode, or a sleep mode. For example, a SIM may comprise one or more transmit chains to facilitate transmitting a transmission and one or more receive chains to facilitate receiving a transmission. The SIM may be operating in the connected mode when at least one transmit chain is active (e.g., to transmit an uplink transmission). The SIM may be operating in the idle mode when no transmit chains are active and at least one receive chain is active (e.g., to perform page monitoring, broadcast channel decoding, idle-mode intra-frequency measurements, inter-frequency measurements, and/or inter-RAT measurements). The SIM may be operating in the sleep mode when no receive chains are active and no transmit chains are active.

The MSIM UE may be operating in a non-concurrent mode (e.g., operating non-concurrently) when the first SIM is operating in a connected mode or idle mode and the second SIM is operating in the sleep mode. The MSIM UE may be operating in the concurrent mode (e.g., operating concurrently) when the first SIM is operating in the connected mode and the second SIM is operating in the idle mode.

Figure 5:
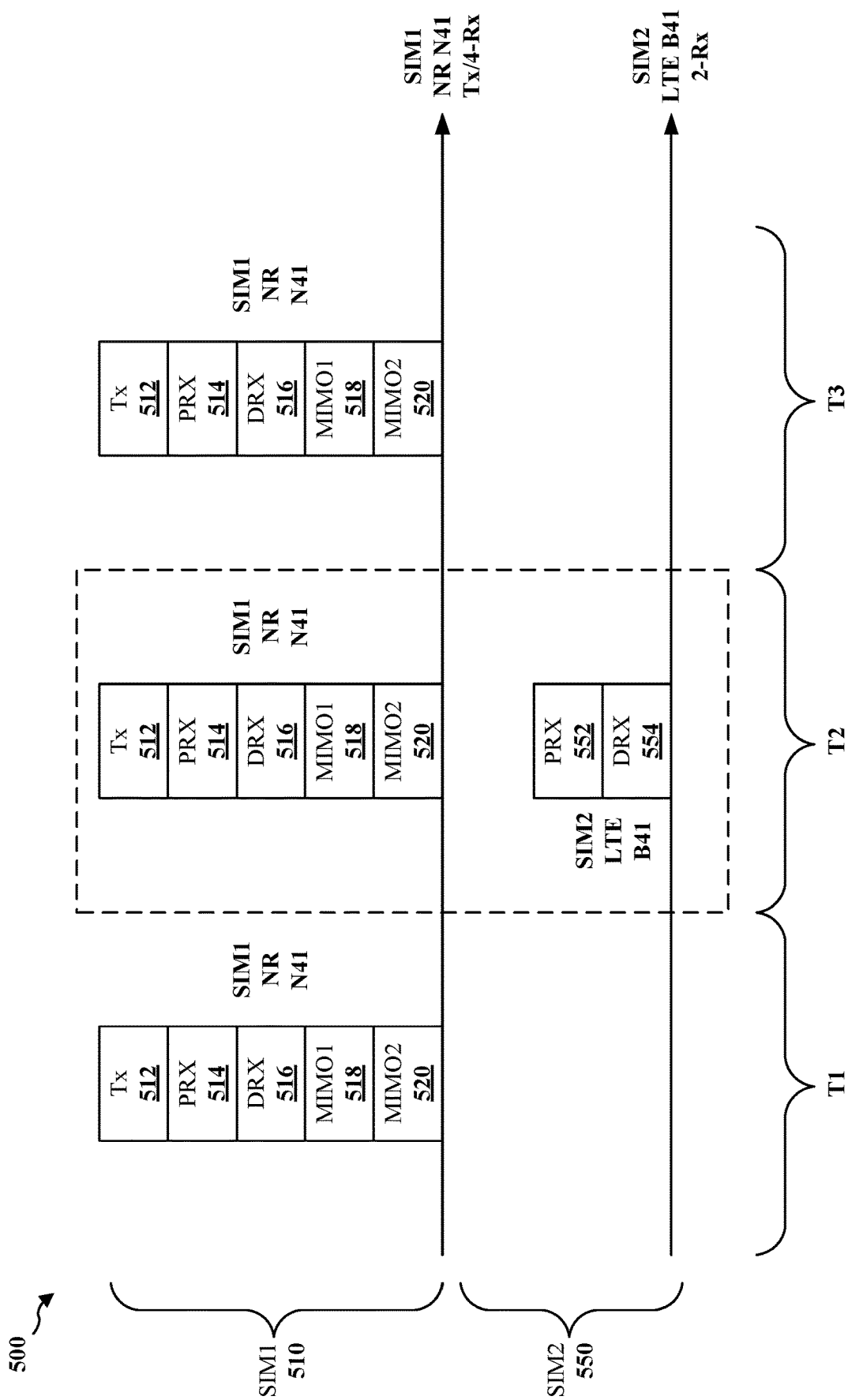
FIG. 5 illustrates aspects of an example MSIM UE comprising a first SIM, employing TDD, and a second SIM, employing TDD, that are co-banded, in accordance with various aspects of the present disclosure.

FIG. 5 illustrates aspects of an example MSIM UE 500 comprising a first SIM 510 and a second SIM 550, as presented herein. The example of FIG. 5 illustrates periods of non-concurrent mode operation and concurrent mode operation of the MSIM UE 500. In the illustrated example, the first SIM 510 is configured to operate in the "n41" NR TDD band and may operate in the connected mode with one transmit chain (Tx) and four receive chains (4-Rx). For example, the first SIM 510 includes a transmit chain 512, a primary receive (PRX) chain 514, a diversity receive (DRX) chain 516, a first MIMO (MIMO1) chain 518, and a second MIMO (MIMO2) chain 520.

In the illustrated example, the second SIM 550 is configured to operate in the "b41" LTE TDD band and may operate in the sleep mode or the idle mode. For example, the second SIM 550 may be operating in the sleep mode during a first time (T1), may be operating in the idle mode during a second time (T2), and may be operating in the sleep mode during a third time (T3). When operating in the sleep mode (e.g., during times T1 and T3), the transmit chains and receive chains of the second SIM 550 may be inactive. When operating in the idle mode (e.g., during time T2), the receive chains of the second SIM 550 may be active (e.g., to perform page decoding and/or measurements). For example, during time T2, the second SIM 550 includes an active PRX chain 552 and an active DRX chain 554.

It may be appreciated that in the illustrated example of FIG. 5, the first SIM 510 and the second SIM 550 are co-banded as the first SIM 510 is configured to operate in the n41 NR TDD band and the second SIM 550 is configured to operate in the b41 LTE TDD band.

In the illustrated example of FIG. 5, the MSIM UE 500 is operating in the non-concurrent mode during the times T1 and T3, and is operating in the concurrent mode during the time T2. For example, during the times T1 and T3, the first SIM 510 is operating in the connected mode and the second SIM 550 is operating in the sleep mode. During the time T2, the first SIM 510 is operating in the connected mode and the second SIM 550 is operating in the idle mode.

It may be appreciated that in some examples, the MSIM UE 500 of FIG. 5 may tune-away one or more of the transmit chains or receive chains of the SIMs 510, 550 based on available resources. For example, the MSIM UE 500 may comprise one antenna element to facilitate a transmit chain and four antenna elements to facilitate four receive chains. In some such examples, the MSIM UE 500 may tune-away one or more chains of the first SIM 510 to accommodate one or more chains of the second SIM 550. For example, during the time T2, the MSIM UE 500 may tune-away two receive chains of the first SIM 510 to enable the two receive chains 552, 554 of the second SIM 550 to be active. In some examples, when performing tune-away of one or more chains, the MSIM UE 500 may be configured to keep the PRX chain 514 active and to select the one or more chains from the remaining receive chains 516, 518, 520 to tune-away (or make inactive).

Figure 6:
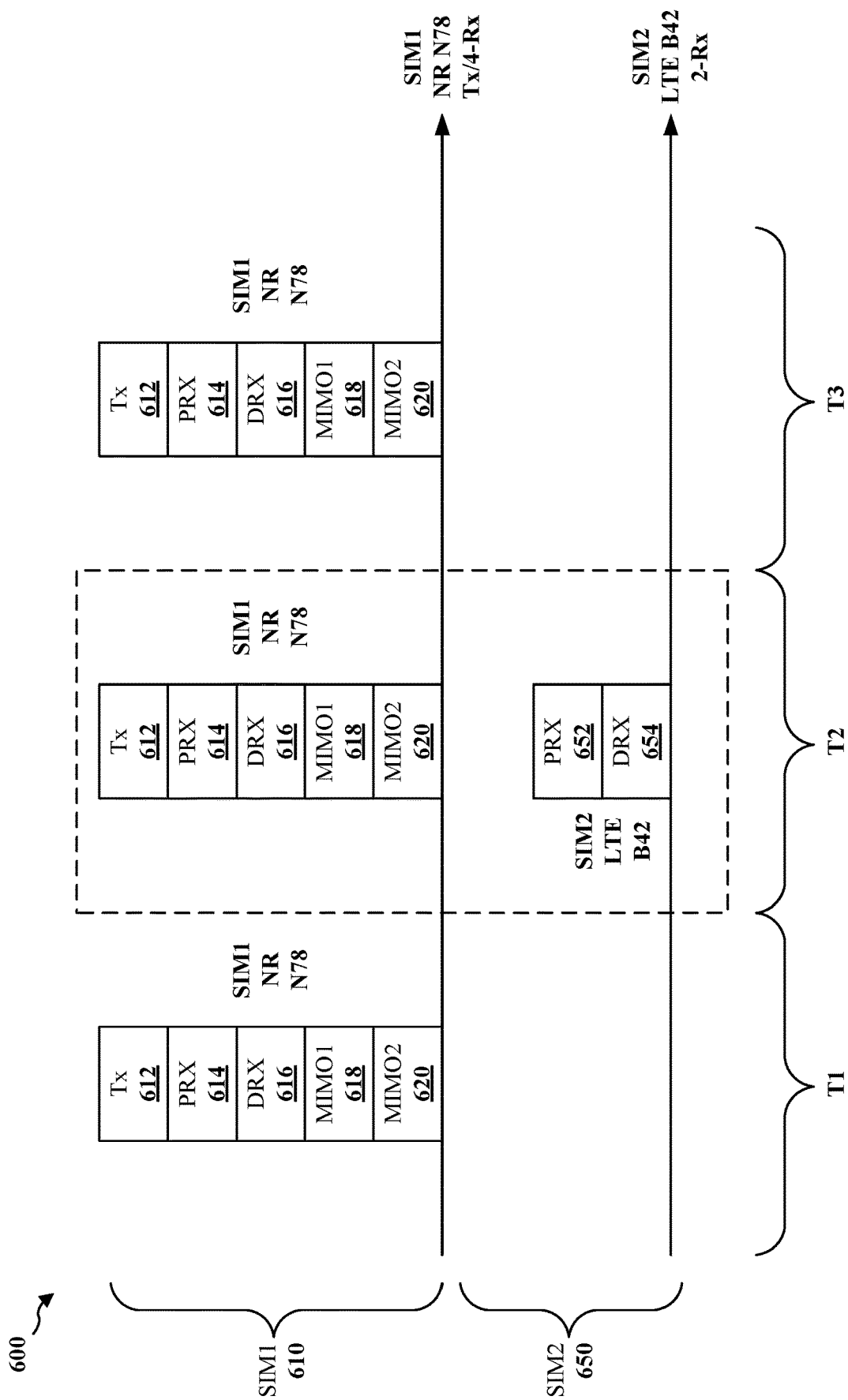
FIG. 6 illustrates aspects of an example MSIM UE comprising a first SIM, employing TDD, and a second SIM, employing TDD, operating with spectrum overlap, in accordance with various aspects of the present disclosure.

FIG. 6 illustrates aspects of an example MSIM UE 600 comprising a first SIM 610 and a second SIM 650, as presented herein. The example of FIG. 6 illustrates periods of non-concurrent mode operation and concurrent mode operation of the MSIM UE 600. Aspects of the first SIM 610 may be similar to the first SIM 510 of FIG. 5. For example, the first SIM 610 comprises a transmit chain 612, a PRX chain 614, a DRX chain 616, a MIMO1 chain 618, and a MIMO2 chain 620. Aspects of the second SIM 650 may be similar to the second SIM 550 of FIG. 5. For example, the second SIM 650 comprises an active PRX chain 652 and an active DRX chain 654 while operating in the idle mode.

In the illustrated example of FIG. 6, the first SIM 610 is configured to operate in the n78 NR TDD band and the second SIM 650 is configured to operate in the b42 LTE TDD band. While the operating bands of the respective SIMS 610, 650 of FIG. 6 are not the same band, at least a portion of the spectrums of the SIMS 610, 650 overlap. Thus, the first SIM 610 and the second SIM 650 are operating with spectrum overlap.

Similar to the illustrated example of FIG. 5, the MSIM UE 600 of FIG. 6 is operating in the non-concurrent mode during the times T1 and T3, and is operating in the concurrent mode during the time T2. For example, during the times T1 and T3, the first SIM 610 is operating in the connected mode and the second SIM 650 is operating in the sleep mode. During the time T2, the first SIM 610 is operating in the connected mode and the second SIM 650 is operating in the idle mode.

Figure 7:
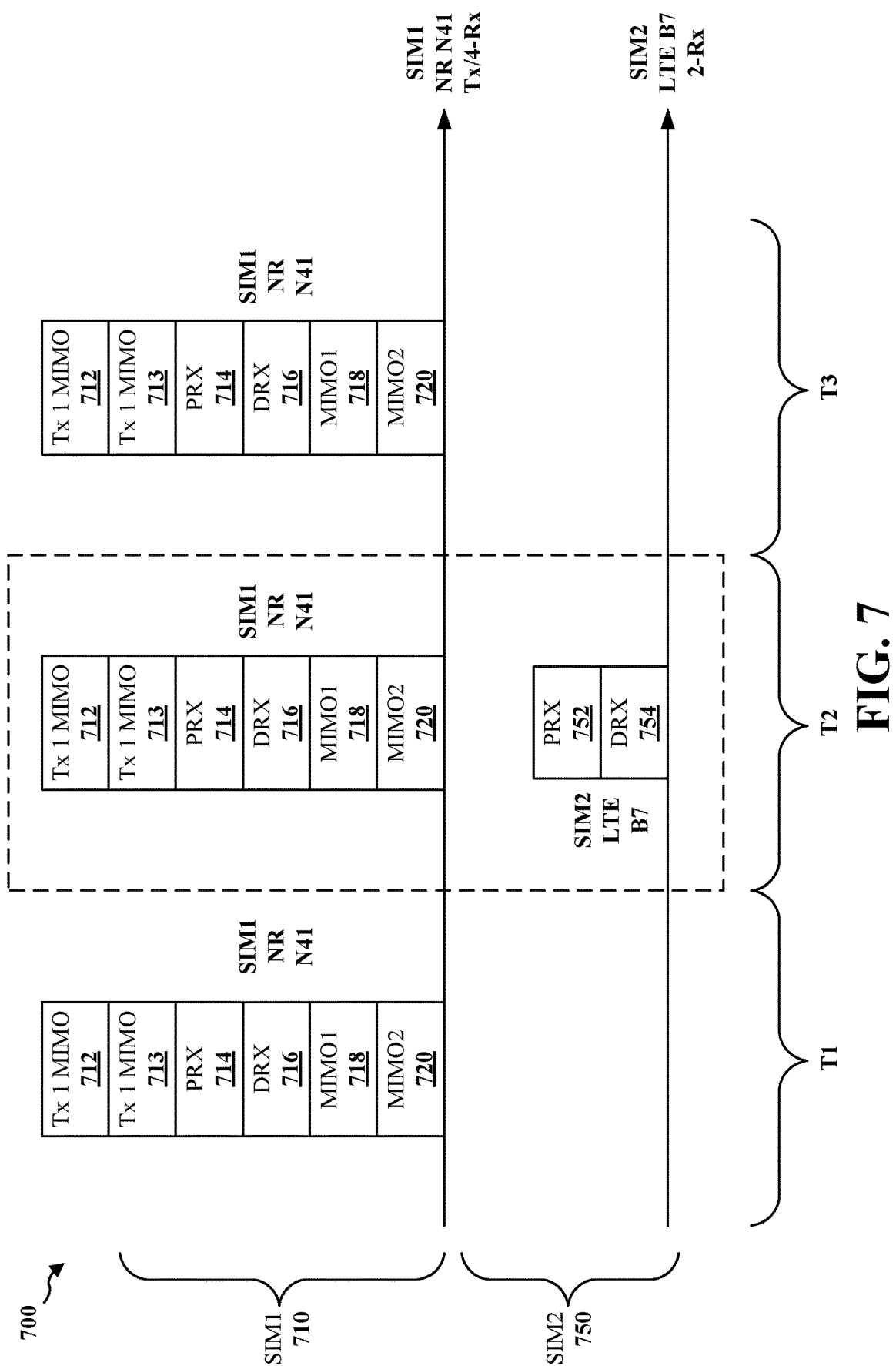
FIG. 7 illustrates aspects of an example MSIM UE comprising a first SIM, employing TDD, and a second SIM, employing FDD, operating with spectrum overlap, in accordance with various aspects of the present disclosure.

FIG. 7 illustrates aspects of an example MSIM UE 700 comprising a first SIM 710 and a second SIM 750, as presented herein. The example of FIG. 7 illustrates periods of non-concurrent mode operation and concurrent mode operation of the MSIM UE 700. Aspects of the first SIM 710 may be similar to the first SIM 510 of FIG. 5 and/or the first SIM 610 of FIG. 6. In the illustrated example, the first SIM 710 employs TDD and comprises a first transmit MIMO chain 712, a second transmit MIMO chain 713, a PRX chain 714, a DRX chain 716, a MIMO chain 718, and a MIMO2 chain 720. In the illustrated example, the second SIM 750 employs FDD and comprises an active PRX chain 752 and an active DRX chain 754 while operating in the idle mode.

In the illustrated example of FIG. 7, the first SIM 710 is configured to operate in the n41 NR TDD band and the second SIM 750 is configured to operate in the b7 LTE FDD band. While the operating bands of the respective SIMs 710, 750 of FIG. 7 are not the same band, at least a portion of the spectrums of the SIMS 710, 750 overlap. Thus, the first SIM 710 and the second SIM 750 are operating with spectrum overlap.

Similar to the illustrated examples of FIGS. 5 and/or 6, the MSIM UE 700 of FIG. 7 is operating in the non-concurrent mode during the times T1 and T3, and is operating in the concurrent mode during the time T2. For example, during the times T1 and T3, the first SIM 710 is operating in the connected mode and the second SIM 750 is operating in the sleep mode. During the time T2, the first SIM 710 is operating in the connected mode and the second SIM 750 is operating in the idle mode.

Figure 8:
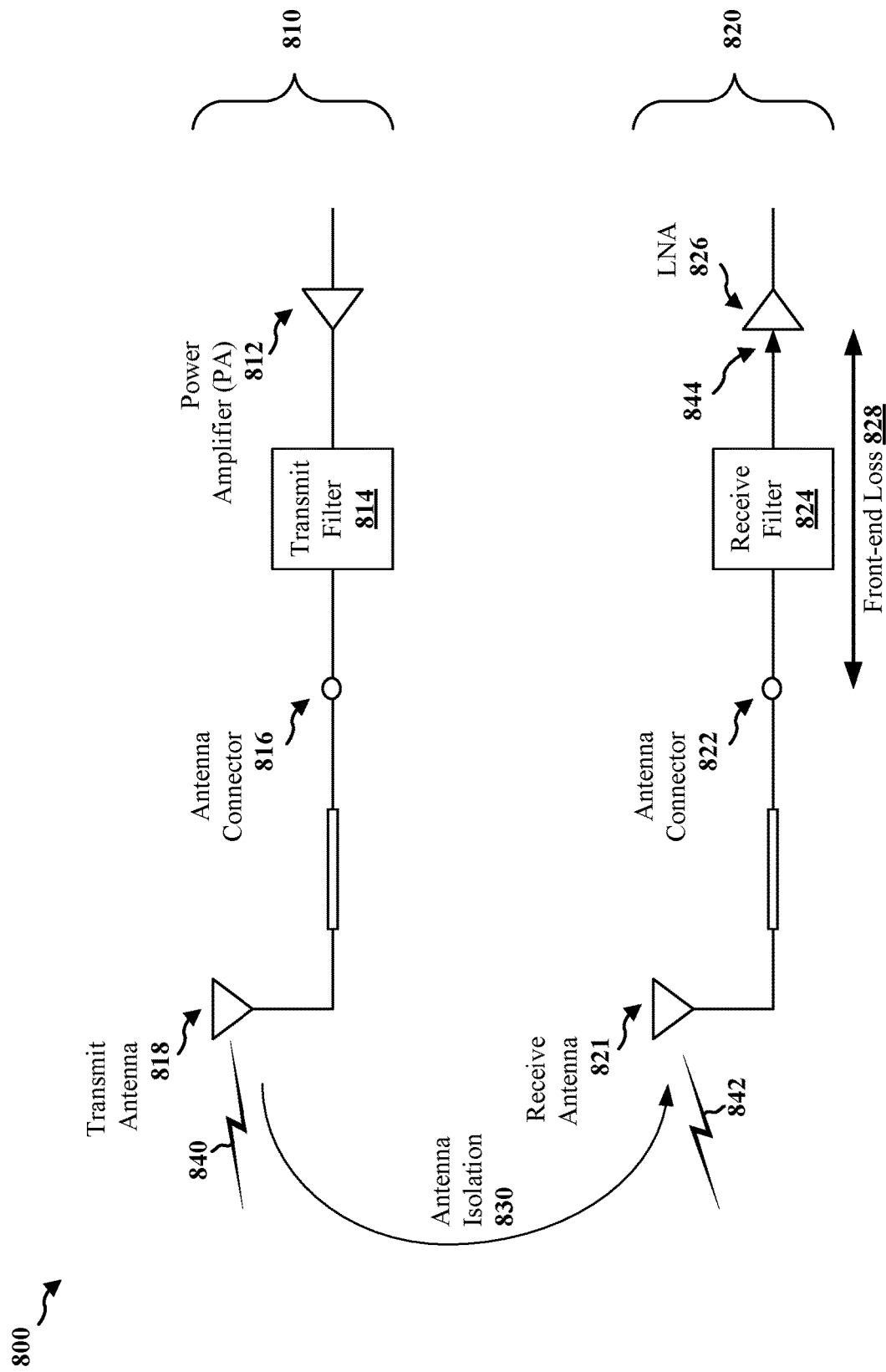
FIG. 8 illustrates an example diagram including an example transmit chain of a first SIM and an example receive chain of a second SIM of an MSIM UE, in accordance with various aspects of the present disclosure.

FIG. 8 illustrates an example diagram including an example transmit chain 810 of a first SIM and an example receive chain 820 of a second SIM of an MSIM UE 800, as presented herein. Aspects of the transmit chain 810 may be implemented by the transmit chain 512 of the first SIM 510 of FIG. 5, the transmit chain 612 of the first SIM 610 of FIG. 6, and/or the transmit chain 712 of the first SIM 710 of FIG. 7. Aspects of the receive chain 820 may be implemented by the PRX chain 552 and/or the DRX chain 554 of the second SIM 550 of FIG. 5, the PRX chain 652 and/or the DRX chain 654 of the second SIM 650 of FIG. 6, and/or the PRX chain 752 and/or the DRX chain 754 of the second SIM 750 of FIG. 7.

In the illustrated example of FIG. 8, the transmit chain 810 includes a power amplifier 812, a transmit filter 814, an antenna connector 816, and a transmit antenna 818. The example receive chain 820 of FIG. 8 includes a receive antenna 821, an antenna connector 822, a receive filter 824, and an LNA 826. It may be appreciated that the transmit filter 814 and/or the receive filter 824 may comprise one or more stages to facilitate filtering frequencies. For example, the transmit filter 814 may include a first stage including a bandpass filter and a second stage including a triplexer. The example receive filter 824 may include a first stage including a triplexer and a second stage including a bandpass filter.

In the example of FIG. 8, the first SIM and the second SIM may be operating in a concurrent mode with the first SIM operating in the connected mode and the second SIM operating in the idle mode, as described above in connection with the times T2 of FIGS. 5, 6, and/or 7. For example, the transmit chain 810 may be active and facilitating the transmitting of a transmission and the receive chain 820 may be active and facilitating the receiving of a transmission.

In the example of FIG. 8, the transmit antenna 818 may transmit a transmission at an output transmit power 840. In some examples, the output transmit power 840 may be based on a power class of the MSIM UE 800. For example, a high power UE (HPUE) may have a maximum output transmit power of 26 dBm and a non-high power UE (non-HPUE) may have a maximum output transmit power of 23 dBm. As used herein, the term "dBm" refers to an absolute value of power, and the term "dB" refers to a ratio of powers. The output transmit power 840 may additionally or alternatively be based on an amount of resources (e.g., resource blocks (RBs)) allocated to the MSIM UE 800 by a network, a modulation and coding scheme, channel conditions for transmission, etc.

In some examples, the transmit power 840 radiated out by the transmit antenna 818, when transmitting a transmission, may be received by the receive chain 820. In particular, a portion of the output transmit power 840 (e.g., an input receive power 842) may be received by the receive antenna 821. The input receive power 842 may pass through the receive filter 824 and be provided to the LNA 826 (e.g., an LNA input 844). The LNA 826 may facilitate improving the sensitivity of the receive chain 820 by amplifying a low-power signal (e.g., the input receive power) that is received at the receive antenna 821/the antenna connector 822.

In some examples, the LNA 826 may be associated with an LNA input power threshold. The LNA input power threshold may be a value that indicates a boundary between a non-saturating LNA input power and a saturating LNA input power. For example, an LNA input power 844 that is greater than the LNA input power threshold may saturate (or overload) the LNA 826 and may cause damage to the LNA 826 and/or may reduce the reliability of the LNA 826. An LNA input power 844 that is less than (or equal to) the LNA input power threshold may not compromise the reliability performance of the LNA 826.

In some examples, antenna isolation may represent an amount of transmit power that is lost between the output transmit power 840 (e.g., at the transmit antenna 818) and the input receive power 842 (e.g., at the receive antenna 821). The amount of transmit power that is lost (e.g., an antenna isolation factor 830) may depend on the antenna topography. For example, the antenna isolation factor 830 for a transmit antenna located at a first bottom corner of a phone and a receive antenna located at a second bottom corner of the phone may be 10 dB (e.g., the input receive power 842 may be 10 dB less than the output transmit power 840).

Figure 12B:
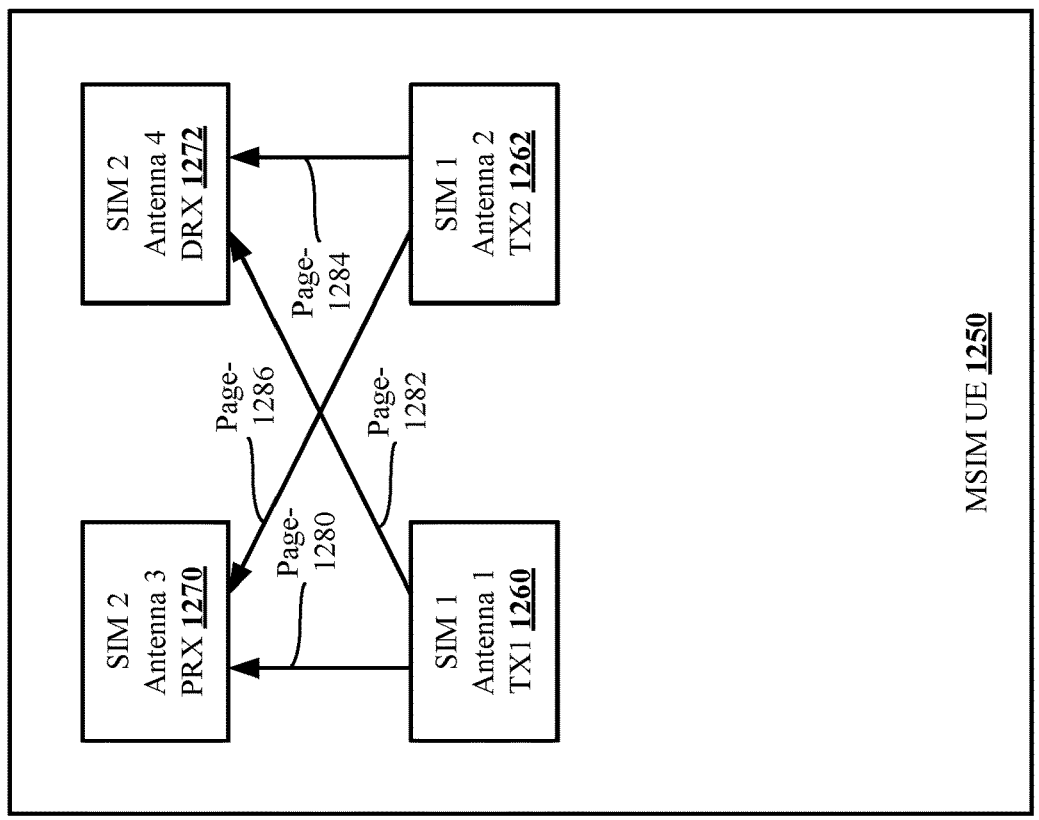
FIG. 12B is a diagram illustrating antenna isolation considerations for a second example UE antenna topology, in accordance with the teachings disclosed herein.
Figure 12A:
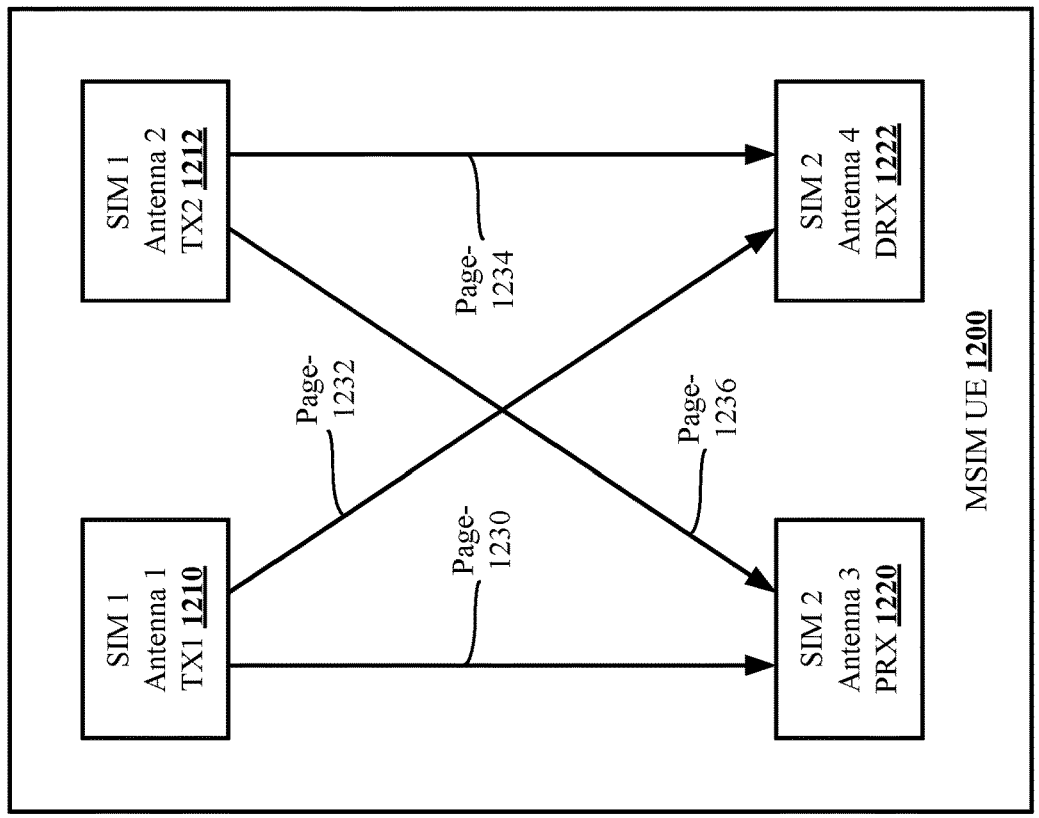
FIG. 12A is a diagram illustrating antenna isolation considerations for a first example UE antenna topology, in accordance with the teachings disclosed herein.

FIGS. 12A and 12B illustrate example MSIM UEs 1200, 1250, respectively, comprising different respective UE antenna topologies, as presented herein. FIG. 12A illustrates a first example UE antenna topology of the MSIM UE 1200 comprising a first antenna (TX1) 1210 that is a transmit chain associated with a first SIM, a second antenna (TX2) 1212 that is a transmit chain associated with the first SIM, a third antenna (PRX) 1220 that is a primary receive chain associated with a second SIM, and a fourth antenna (DRX) 1222 that is a diversity receive chain associated with the second SIM.

As described above, in some examples, the antenna isolation factor may be based on aspects of spatial location of the antennas of the first SIM and the second SIM. For example, the antenna isolation factor may be based on the location of the transmit chain(s) of the first SIM relative to the receive chain(s) of the second SIM. For example, a first antenna isolation factor 1230 may be based on the first antenna 1210 and the third antenna 1220, a second antenna isolation factor 1232 may be based on the first antenna 1210 and the fourth antenna 1222, a third antenna isolation factor 1234 may be based on the second antenna 1212 and the fourth antenna 1222, and a fourth antenna isolation factor 1236 may be based on the second antenna 1212 and the third antenna 1220.

In some examples, the second antenna isolation factor 1232 may be greater than the first antenna isolation factor 1230 as there is better antenna isolation between diagonal antenna locations (e.g., between the first antenna 1210 and the fourth antenna 1222) than there is between relatively adjacent antenna locations (e.g., between the first antenna 1210 and the third antenna 1220). Similarly, the fourth antenna isolation factor 1236 may be greater than the third antenna isolation factor 1234. Although not shown in FIG. 12A, it may be appreciated that in some examples, the first antenna 1210 may be a transmit chain associated with the first SIM and the second antenna 1212 may be a receive chain associated with the second SIM. In some such examples, it may be appreciated that the antenna isolation factor between the first antenna 1210 and the second antenna 1212 may be less than the first antenna isolation factor 1230 and the second antenna isolation factor 1232.

FIG. 12B illustrates a second example UE antenna topology of the MSIM UE 1250 comprising a first antenna (TX1) 1260 that is a transmit chain associated with a first SIM, a second antenna (TX2) 1262 that is a transmit chain associated with the first SIM, a third antenna (PRX) 1270 that is a primary receive chain associated with a second SIM, and a fourth antenna (DRX) 1272 that is a diversity receive chain associated with the second SIM.

As described above, in some examples, the antenna isolation factor may be based on aspects of spatial location of the antennas of the first SIM and the second SIM. For example, the antenna isolation factor may be based on the location of the transmit chain(s) of the first SIM relative to the receive chain(s) of the second SIM. For example, a first antenna isolation factor 1280 may be based on the first antenna 1260 and the third antenna 1270, a second antenna isolation factor 1282 may be based on the first antenna 1260 and the fourth antenna 1272, a third antenna isolation factor 1284 may be based on the second antenna 1262 and the fourth antenna 1272, and a fourth antenna isolation factor 1286 may be based on the second antenna 1262 and the third antenna 1270.

In some examples, the second antenna isolation factor 1282 may be greater than the first antenna isolation factor 1280 as there is better antenna isolation between diagonal antenna locations (e.g., between the first antenna 1260 and the fourth antenna 1272) than there is between relatively adjacent antenna locations (e.g., between the first antenna 1260 and the third antenna 1270). Similarly, the fourth antenna isolation factor 1286 may be greater than the third antenna isolation factor 1284. Although not shown in FIG. 12B, it may be appreciated that in some examples, the first antenna 1260 may be a transmit chain associated with the first SIM and the second antenna 1262 may be a receive chain associated with the second SIM. In some such examples, it may be appreciated that the antenna isolation factor between the first antenna 1260 and the second antenna 1262 may be less than the first antenna isolation factor 1280 and the second antenna isolation factor 1282.

In some examples, the MSIM UE may determine locations of the active chains of the first SIM and the second SIM and determine the antenna isolation factor accordingly. In some examples, the antenna isolation factor for different antenna spatial combinations of the active chains may be based on different operating bands/operating frequencies and/or operating temperatures for the corresponding antenna spatial combinations. In some examples, different antenna isolation factors may be calibrated based on different operating bands/operating frequencies and/or operating temperature combinations for the corresponding antenna spatial combinations.

Returning to the illustrated example of FIG. 8, the receive filter 824 may facilitate limiting bandwidth, and, thereby reduce the input power 844 received at the LNA 826. For example, a front-end loss factor 828 may represent an amount of power that is lost at the receive chain 820 between the input receive power 842 at the receive antenna 821 and the LNA input power 844 at the LNA 826. In some examples, the front-end loss factor may be based on an operating frequency of the receive chain 820 and/or an operating frequency of the receive chain 820.

As an illustrative example, a non-HPUE may transmit a transmission, via the transmit antenna 818, at an output transmit power 840 of 23 dBm, the antenna isolation factor 830 may be 10 dB, the front-end loss factor 828 may be 2 dB, and the LNA input power threshold may be 15 dBm. In some such examples, the LNA input power 844 may be 11 dBm (e.g., 23 dBm−10 dB−2 dB=11 dBm), which is less than the LNA input power threshold (e.g., 15 dBm) and, thus, the performance of the LNA 826 may not be compromised.

In another example, an HPUE may transmit a transmission, via the transmit antenna 818, at an output transmit power 840 of 26 dBm, the antenna isolation factor 830 may be 10 dB, the front-end loss factor 828 may be 2 dB, and the LNA input power threshold may be 15 dBm. In some such examples, the LNA input power 844 may be 14 dBm (e.g., 26 dBm−10 dB−2 dB=14 dBm), which is less than the LNA input power threshold (e.g., 15 dBm) and, thus, the performance of the LNA 826 may not be compromised.

However, in some examples, the LNA input power 844 may be greater than the LNA input power threshold. For example, in some examples, a peak-to-average power ratio may be added to the output transmit power 840. The peak-to-average power ratio may correspond to the extremes in peak amplitude of a signal used for an OFDM transmission. As an OFDM transmission may be subject to extremes in peak amplitudes, it may be beneficial to account for the peak-to-average power ratio when determining the input receive power 842 received at the receive antenna 821/receive chain 820.

As an illustrative example, a non-HPUE may transmit a transmission, via the transmit antenna 818, at an output transmit power 840 of 23 dBm, the peak-to-average power ratio may be 6 dB, the antenna isolation factor 830 may be 10 dB, the front-end loss factor 828 may be 2 dB, and the LNA input power threshold may be 15 dBm. In some such examples, the LNA input power 844 may be 17 dBm (e.g., 23 dBm+6 dB−10 dB−2 dB=17 dBm), which is greater than the LNA input power threshold (e.g., 15 dBm) and, thus, may compromise the performance of the LNA 826. However, it may be appreciated that reducing the LNA input power 844 by 2 dB would result in an LNA input power 844 that satisfies the LNA input power threshold (e.g., an LNA input power that is less than (or equal to) the LNA input power threshold). In particular, reducing the output transmit power 840 from 23 dB to 21 dB would result in an LNA input power 844 that satisfies the LNA input power threshold (e.g., 15 dBm).

In another example, an HPUE may transmit a transmission, via the transmit antenna 818, at an output transmit power 840 of 26 dBm, the peak-to-average power ratio may be 6 dB, the antenna isolation factor 830 may be 10 dB, the front-end loss factor 828 may be 2 dB, and the LNA input power threshold may be 15 dBm. In some such examples, the LNA input power 844 may be 20 dBm (e.g., 26 dBm+6 dB−10 dB−2 dB=20 dBm), which is greater than the LNA input power threshold (e.g., 15 dBm) and, thus, may compromise (or negatively impact) the performance of the LNA 826. However, it may be appreciated that reducing the LNA input power 844 by 5 dB would result in an LNA input power 844 that satisfies the LNA input power threshold (e.g., an LNA input power that is less than (or equal to) the LNA input power threshold). In particular, reducing the output transmit power 840 from 26 dB to 21 dB would result in an LNA input power 844 that satisfies the LNA input power threshold (e.g., 15 dBm).

Although not shown in the illustrated example of FIG. 8, it may be appreciated that in some examples, the MSIM UE 800 may be capable of UL-MIMO. For example, the MSIM UE 800 may be capable of using two or more transmit chains for an uplink transmission. As an illustrative example, the MSIM UE 800 may include two transmit chains for an uplink transmission, and the MSIM UE 800 may be a non-HPUE (e.g., a maximum output transmit power of 23 dBm or 200 milliwatts (mW)). In such examples, the sum of the total radiated energy (e.g., 200 mW+200 mW=400 mW) may be 26 dBm. As described above, an output transmit power of 26 dBm results in an LNA input power 844 that is 5 dB greater than the LNA input power threshold (e.g., 15 dBm). However, to achieve an LNA input power 844 that satisfies the LNA input power threshold (e.g., that is less than (or equal to) 15 dBm), the reduction of 5 dB is for each of the two transmit chains. For example, if each transmit chain transmits at an output transmit power of 18 dB (or 63 mW), then the total radiated power (e.g., 63 mW+63 mW=126 mW) may be 21 dBm. Assuming a peak-to-average power ratio of 6 dB, an antenna isolation factor 830 of 10 dB, a front-end loss factor 828 of 2 dB, and an LNA input power threshold of 15 dBm, the LNA input power 844 may be 15 dBm (e.g., 21 dBm+6 dB−10 dB−2 dB=15 dBm), which is equal to the LNA input power threshold (e.g., 15 dBm) and, thus, satisfies the LNA input power threshold and may not compromise the performance of the LNA 826.

It may be appreciated that in the above example in which the MSIM UE is capable of UL-MIMO, in some examples, one or more of the transmit chains used for facilitating the UL-MIMO may be tuned-away. For example, the MSIM UE may employ two transmit chains to facilitate UL-MIMO, but one of the transmit chains may be tuned-away. In such examples, it may be appreciated that the determining of the LNA input power 844 may be performed similar to the above examples of FIG. 8 in which the MSIM UE 800 included only transmit chain 810.

Aspects presented herein enable an MSIM UE to estimate a maximum transmit power for transmitting an uplink transmission based on a configuration of the MSIM UE. For example, techniques disclosed herein may estimate the maximum transmit power based on a relationship between an LNA input power threshold, an antenna isolation factor associated with a loss in transmit power between the transmit chain and the receive chain, a front-end loss factor associated with a loss in power between the receive antenna and the LNA of the receive chain, and/or a peak-to-average power ratio.

In some examples, the MSIM UE may monitor for an occurrence of an MSIM concurrent mode management triggering event based on an operating band and operating mode of the first SIM and the second SIM of the MSIM UE. For example, disclosed techniques may determine that the respective operating bands of the first SIM and the second SIM indicate that the operating bands are co-banded or overlap in spectrum. Additionally, disclosed techniques may determine that the first SIM is operating in a connected mode comprising at least one active transmit chain and that the second SIM is operating in an idle mode comprising at least one receive chain.

In some examples, when an occurrence of an MSIM concurrent mode management triggering event is detected, the MSIM UE may adjust a target transmit power to transmit an uplink transmission. Disclosed techniques may then transmit the uplink transmission based on the target transmit power and the estimated maximum transmit power. For example, disclosed techniques may transmit the uplink transmission based on the target transmit power when the target transmit power is less than (or equal to) the estimated maximum transmit power. Otherwise, disclosed techniques may transmit the uplink transmission based on the estimated maximum transmit power when the target transmit power is greater than the estimated maximum power.

Figure 9:
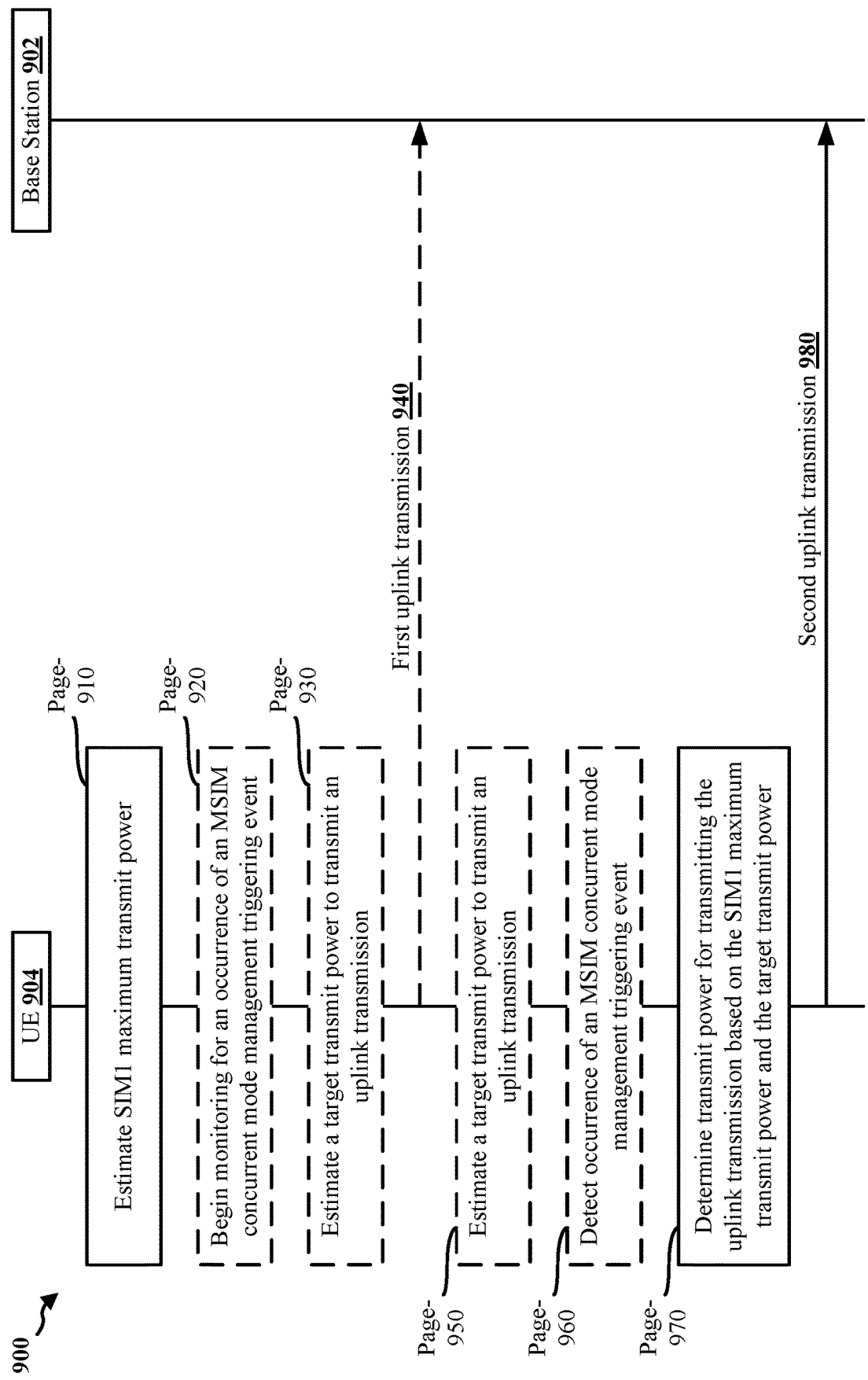
FIG. 9 is an example communication flow between a base station and a UE, in accordance with various aspects of the present disclosure.

FIG. 9 illustrates an example communication flow 900 between a base station 902 and a UE 904, as presented herein. In the illustrated example, the communication flow 900 facilitates the UE 904 transmitting an uplink transmission at a transmit power that does not compromise the performance of an LNA of a receive chain of the UE 904. Aspects of the base station 902 may be implemented by the base station 102/180 of FIG. 1 and/or the base station 310 of FIG. 3. Aspects of the UE 904 may be implemented by the UE 104 of FIG. 1, the UE 350 of FIG. 3, the MSIM UE 500 of FIG. 5, the MSIM UE 500 of FIG. 6, the MSIM UE 700 of FIG. 7, and/or the MSIM UE 800 of FIG. 8. Although not shown in the illustrated example of FIG. 9, it may be appreciated that in additional or alternative examples, the base station 902 may be in communication with one or more other base stations or UEs, and/or the UE 904 may be in communication with one or more other base stations or UEs.

In the illustrated example, the UE 904 may be implemented by an MSIM UE comprising a first SIM configured to facilitate 5G NR communications and a second SIM configured to facilitate LTE communications. Each of the SIMS may be configured to operate within an operating band, and may be configured to operate in a connected mode, an idle mode, or a sleep mode. In some examples, the SIMS may employ TDD (e.g., as described above in connection with FIGS. 5 and/or 6). In some examples, the first SIM may employ TDD and the second SIM may employ FDD (e.g., as described above in connection with FIG. 7). In some examples, the first SIM may employ FDD and the second SIM may employ TDD.

At 910, the UE 904 estimates a maximum transmit power for a first SIM. The UE 904 may estimate the maximum transmit power for the first SIM based on a relationship between an LNA input power threshold, an antenna isolation factor associated with a loss in transmit power between the transmit chain and the receive chain, a front-end loss factor associated with a loss in power between the receive antenna and the LNA of the receive chain, and/or a peak-to-average power ratio. For example, the UE 904 may apply Equation 1 (below) to estimate the maximum transmit power for the first SIM.

$$SIM\_1\_Tx\_pwr \leq (SIM2\_Rx\_LNA\_max\_input\_pwr) + (SIM2\_Rx\_frontend\_loss) - (max\_peak\_to\_ave\_pwr) - (antenna\_isolation) \quad \text{Equation 1:}$$

In Equation 1, the variable "SIM1_Tx_pwr" corresponds to the maximum output transmit power at which the first SIM may transmit a transmission (e.g., a maximum value for the output transmit power 840 of FIG. 8). The variable "SIM2_Rx_LNA_max_input_pwr" corresponds to the LNA input power threshold associated with the LNA of the receive chain of the second SIM (e.g., the LNA 826 of FIG. 8). The variable "SIM2_Rx_frontend_loss" corresponds to the front-end power loss (e.g., the front-end loss 828) incurred between the input power received at the receive chain and the input power received at the LNA (e.g., the loss in power between the input receive power 842 and the LNA input power 844). The variable "max_peak_to_ave_pwr" corresponds to the extremes in peak amplitude of a signal used for an OFDM transmission. The variable "antenna_isolation" corresponds to the loss in power incurred between the transmit antenna and the receive antenna (e.g., the antenna isolation factor 830 of FIG. 8).

At 920, the UE 904 may begin monitoring for an occurrence of an MSIM concurrent mode management triggering event. For example, the UE 904 may monitor for a period during which the first SIM is operating in a connected mode and the second SIM is operating in an idle mode (e.g., as described above in connection with times T2 of FIGS. 5, 6, and/or 7). The UE 904 may also monitor, during that period, for when the first SIM and the second SIM are TDD and are either operating co-banded (e.g., as described above in connection with FIG. 5), overlapping in spectrum (e.g., as described above in connection with FIG. 6), or when the first SIM is employing TDD and the second SIM is employing FDD and overlap in spectrum (e.g., as described above in connection with FIG. 7).

At 930, the UE 904 may estimate a target transmit power to transmit a first uplink transmission 940. For example, the UE 904 may estimate the target transmit power to transmit the first uplink transmission 940 at a first time based on an amount of resources (e.g., resource blocks (RBs)) allocated to the UE 904, a modulation and coding scheme, channel conditions for transmission, etc.

In some examples, the UE 904 may transmit the first uplink transmission 940 that is received by the base station 902. The UE 904 may transmit the first uplink transmission 940 using the target transmit power (e.g., estimated at 930).

In the illustrated example, the UE 904 estimates (at 930) the target transmit power to transmit the first uplink transmission 940 and transmits the first uplink transmission 940 based on a determination an occurrence of the MSIM concurrent mode management triggering event is not detected. For example, the UE 904 may determine that the first SIM and the second SIM may be operating in a non-concurrent mode (e.g., as described above in connection with times T1 and T3 of FIGS. 5, 6, and/or 7), that the first SIM and/or the second SIM may not be TDD, that both SIMS are FDD, and/or that the first SIM and the second SIM are neither co-banded or overlapping in spectrum.

At 950, the UE 904 may estimate a target transmit power to transmit a second uplink transmission 980. For example, the UE 904 may estimate the target transmit power to transmit the second uplink transmission 980 at a second time based on an amount of resources (e.g., resource blocks (RBs)) allocated to the UE 904, a modulation and coding scheme, channel conditions for transmission, etc.

At 960, the UE 904 may detect an occurrence of an MSIM concurrent mode management triggered event. For example, the UE 904 may determine that during the second time, the first SIM and the second SIM are operating in a concurrent mode, the first SIM and the second SIM are TDD, and the first SIM and the second SIM are either co-banded or overlapping in spectrum. For example, during time T2 of FIG. 5, the first SIM 510 and the second SIM 550 are operating in a concurrent mode, are TDD, and are co-banded. During the time T2 of FIG. 6, the first SIM 610 and the second SIM 650 are operating in a concurrent mode, are TDD, and overlap in spectrum. In some examples, the UE 904 may determine that during the second time, the first SIM and the second SIM are operating in a concurrent mode, one SIM is TDD and the other SIM is FDD, and the first SIM and the second SIM are overlapping in spectrum. For example, during time T2 of FIG. 7, the first SIM 710 and the second SIM 750 are operating in a concurrent mode, the first SIM 710 is TDD and the second SIM 750 is FDD, and overlap in spectrum. However, it may be appreciated that in some examples, the first SIM may employ FDD and the second SIM may employ TDD.

At 970, the UE 904 determines a transmit power for transmitting the second uplink transmission based on the first SIM maximum transmit power and the target transmit power. For example, the UE 904 may compare the target transmit power to the first SIM maximum transmit power. The UE 904 may determine to transmit the second transmission 980 at the first SIM maximum transmit power when the target transmit power is greater than the first SIM maximum transmit power. Otherwise, the UE 904 may determine to transmit the second transmission 980 at the target transmit power (e.g., the target transmit power is less than (or equal to) the first SIM maximum transmit power). In some examples, the determination of the transmit power at 970 may be based on multiple SIMS operating concurrently, the multiple SIMS being co-banded or using an overlapping spectrum for concurrent operation, antenna isolation between the SIMS, a front-end loss factor for a SIM receive antenna, and/or LNA information for a SIM, such as described above in connection with 920, 930, 950, and/or 960.

The UE 904 transmits the second uplink transmission 980 that is received by the base station 902. The UE 904 may transmit the second uplink transmission 980 using the determined transmit power (e.g., at 970).

Figure 10:
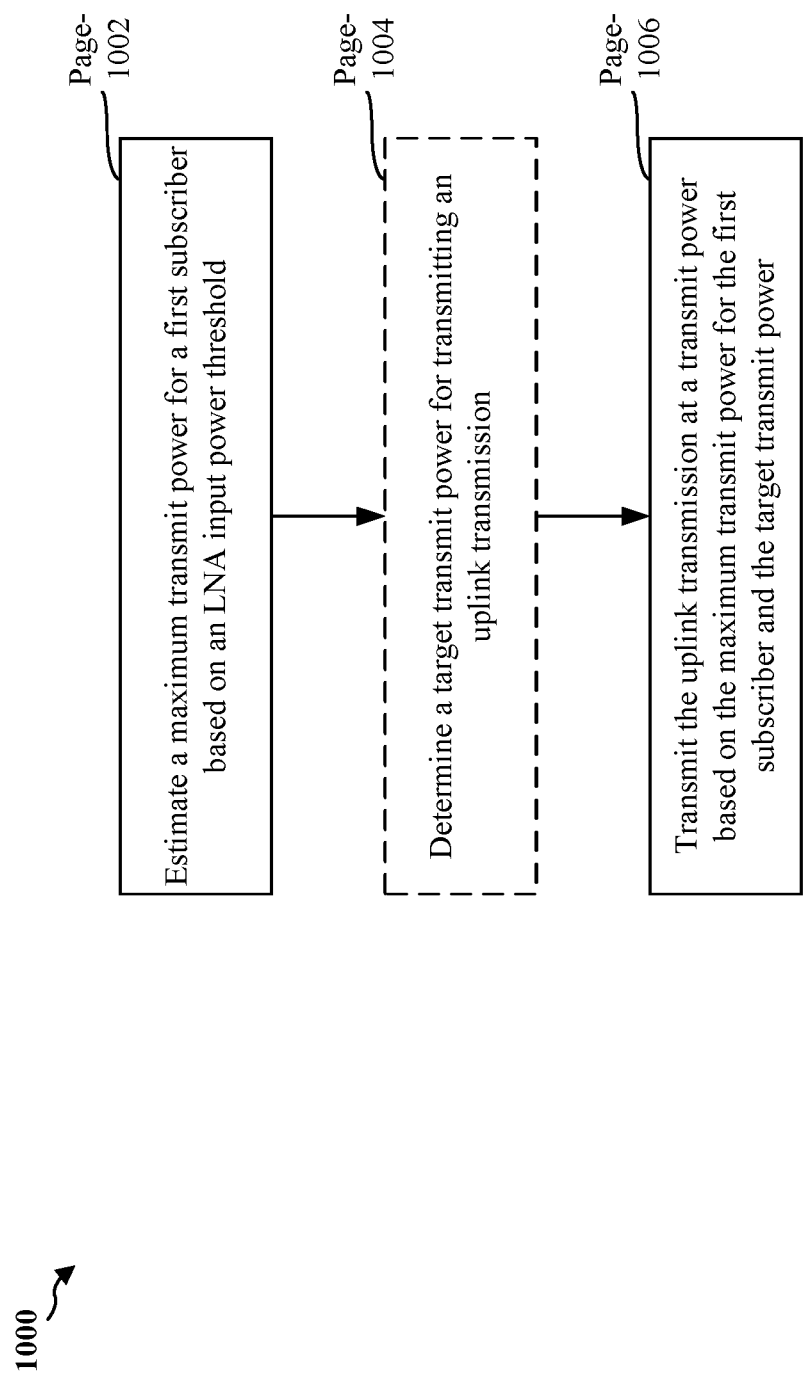
FIG. 10 is a flowchart of a method of wireless communication at a UE, in accordance with the teachings disclosed herein.

FIG. 10 is a flowchart 1000 of a method of wireless communication. The method may be performed by a UE or a component of a UE (e.g., the UE 104, the UE 350, the MSIM UE 500 of FIG. 5, the MSIM UE 600 of FIG. 6, the MSIM UE 700 of FIG. 7, the MSIM UE 800 of FIG. 8, and/or the UE 904 of FIG. 9; the apparatus 1102, a processing system, which may include the memory 360 and which may be the entire UE 350 or a component of the UE 350, such as the TX processor 368, the RX processor 356, and/or the controller/processor 359). Optional aspects are illustrated with a dashed line. The method may facilitate controlling transmit power during concurrent mode so that the transmit power does not compromise an LNA of a receive chain of the UE.

At 1002, the UE estimates a maximum transmit power for a first subscriber based on an LNA input power threshold, as described above in connection with 910 of FIG. 9. For example, a maximum transmit power estimation component

Figure 11:
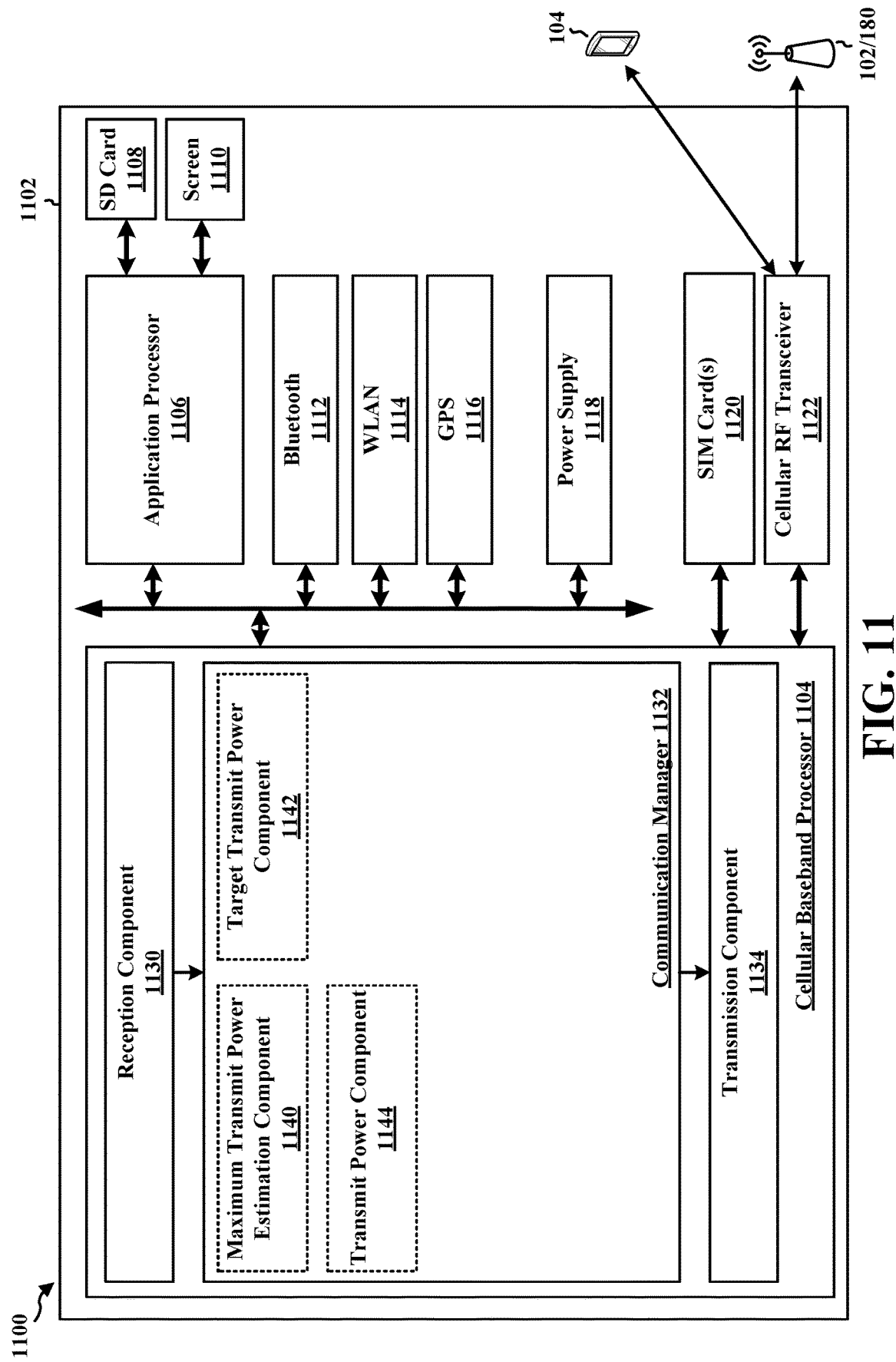
FIG. 11 is a diagram illustrating an example of a hardware implementation for an example apparatus, in accordance with the teachings disclosed herein.

1140 of an apparatus 1102 of FIG. 11 may facilitate estimating the maximum transmit power for the first subscriber.

In some examples, the UE may estimate the first subscriber maximum transmit power based on a relationship between at least the second subscriber LNA input power threshold, an antenna isolation factor associated with the first subscriber and the second subscriber, and a front-end loss factor associated with the second subscriber. In some examples, the relationship may also include a peak-to-average power ratio. In some examples, the UE may apply Equation 1 (above) to estimate the maximum transmit power for the first subscriber. In some examples, the second subscriber LNA input power threshold may correspond to an input power received at the LNA of the active second subscriber receive chain based on transmission by the active first subscriber transmit chain. In some examples, the first subscriber may be capable of UL-MIMO. In some such examples, the first subscriber maximum transmit power may correspond to each active transmit chain of the first subscriber. In some examples, the antenna isolation factor may be based on an active first subscriber transmit chain and the active second subscriber receive chain. In some examples, the front-end loss factor may correspond to an input power loss associated with the active second subscriber receive chain. In some examples, the antenna isolation factor may be based on an operating frequency of the first subscriber and the second subscriber. In some examples, the antenna isolation factor may be based on a relationship between a spatial location of the transmit chain relative to a spatial location of the receive chain. In some examples, the front-end loss factor may be based on an operating frequency of the second subscriber and an operating temperature of the second subscriber.

At 1004, the UE may determine a target transmit power for transmitting an uplink transmission, as described above in connection with 930 and/or 950 of FIG. 9. For example, a target transmit power component 1142 may facilitate determining the target transmit power for transmitting the uplink transmission. In some examples, the target transmit power may be based on an amount of resources (e.g., resource blocks (RBs)) allocated to the MSIM UE 800 by a network, a modulation and coding scheme, and/or channel conditions for transmission.

Finally, at 1006, the UE transmits the uplink transmission at a transmit power based on the first subscriber and the second subscriber operating concurrently, and based on the maximum transmit power for the first subscriber and the target transmit power, as described above in connection with 920, 960, and 970 of FIG. 9. For example, a transmit power component 1144 of the apparatus 1102 of FIG. 11 may facilitate transmitting the uplink transmission at the transmit power.

In some examples, the UE may transmit the uplink transmission at the first subscriber maximum transmit power when the target transmit power is greater than the first subscriber maximum transmit power, the first subscriber and the second subscriber are operating in a concurrent mode, the first subscriber and the second subscriber each employ TDD, and the first subscriber and the second subscriber are either co-banded or overlap in spectrum. In some examples, the first subscriber and the second subscriber may be operating in the concurrent mode when at least one transmit chain of the first subscriber is active while at least one receive chain of the second subscriber is active.

In some examples, the UE may transmit the uplink transmission at the target transmit power when the target transmit power is less than (or equal to) the first subscriber maximum transmit power, the first subscriber and the second subscriber are operating in a non-concurrent mode, at least the first subscriber or the second subscriber is not employing TDD, or the first subscriber and the second subscriber are neither co-banded nor overlap in spectrum.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see the UE 350 of FIG. 3) and include the aforediscussed additional modules of the apparatus 1102.

The communication manager 1132 includes a maximum transmit power estimation component 1140 that is configured to estimate a maximum transmit power for a first subscriber, e.g., as described above in connection with 1002 of FIG. 10. The communication manager 1132 further includes a target transmit power component 1142 that is configured to determine a target transmit power for transmitting an uplink transmission, e.g., as described above in connection with 1004 of FIG. 10. The communication manager 1132 further includes a transmit power component 1144 that is configured to determine a transmit power for transmitting the uplink transmission, e.g., as described above in connection with 1006 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for performing any of the aspects of the method of FIG. 10.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Example 1 is a method of wireless communication at a UE, comprising: estimating a maximum transmit power for a first subscriber based on LNA input power threshold associated with an active receive chain of a second subscriber, wherein the UE comprises the first subscriber and the second subscriber; and transmitting, via an active transmit chain of the first subscriber, an uplink transmission at the first subscriber maximum transmit power based on the first subscriber and the second subscriber operating concurrently, and a transmit power associated with the uplink transmission being greater than the first subscriber maximum transmit power.

In Example 2, the method of Example 1 further includes transmitting the uplink transmission at the transmit power when the transmit power is less than or equal to the first subscriber maximum transmit power.

In Example 3, the method of any of Example 1 or Example 2 further includes that the first subscriber and the second subscriber are operating concurrently when at least one transmit chain of the first subscriber is active while at least one receive chain of the second subscriber is active.

In Example 4, the method of any of Examples 1 to 3 further includes that the first subscriber employs TDD, the second subscriber employs TDD or FDD, and the first subscriber and the second subscriber are either co-banded or overlap in spectrum.

In Example 5, the method of any of Examples 1 to 4 further includes that estimating the first subscriber maximum transmit power is based on a relationship between at least the second subscriber LNA input power threshold, an antenna isolation factor associated with the first subscriber and the second subscriber, and a front-end loss factor associated with the second subscriber.

In Example 6, the method of any of Examples 1 to 5 further includes that the second subscriber LNA input power threshold corresponds to an input power received at the LNA of the active second subscriber receive chain based on transmission by the active first subscriber transmit chain.

In Example 7, the method of any of Examples 1 to 6 further includes that the first subscriber is capable of UL-MIMO, and wherein the first subscriber maximum transmit power corresponds to each active transmit chain of the first subscriber.

In Example 8, the method of any of Examples 1 to 7 further includes that the relationship further comprises a peak-to-average power ratio.

In Example 9, the method of any of Examples 1 to 8 further includes that the antenna isolation factor is based on an active first subscriber transmit chain and the active second subscriber receive chain.

In Example 10, the method of any of Examples 1 to 9 further includes that the antenna isolation factor is based on an operating frequency of the first subscriber and the second subscriber.

In Example 11, the method of any of Examples 1 to 10 further includes that the antenna isolation factor is based on a relationship between a spatial location of the transmit chain relative to a spatial location of the receive chain.

In Example 12, the method of any of Examples 1 to 11 further includes that the front-end loss factor corresponds to an input power loss associated with the active second subscriber receive chain.

In Example 13, the method of any of Examples 1 to 12 further includes that the front-end loss factor is based on an operating frequency of the second subscriber and an operating temperature of the second subscriber.

Example 14 is a device including one or more processors and one or more memories in electronic communication with the one or more processors storing instructions executable by the one or more processors to cause a system or an apparatus to implement a method as in any of Examples 1 to 13.

Example 15 is a system or apparatus including means for implementing for implementing the functions in any of Examples 1 to 13.

Example 16 is a non-transitory computer-readable medium storing instructions executable by one or more processors to cause the one or more processors to implement a method as in any of Examples 1 to 13.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    estimating a maximum transmit power for a first subscriber based on a low-noise amplifier (LNA) input power threshold associated with an active receive chain of a second subscriber, wherein the UE comprises the first subscriber and the second subscriber; and
    transmitting, via an active transmit chain of the first subscriber, an uplink transmission at the first subscriber maximum transmit power based on
        the first subscriber and the second subscriber operating concurrently, and
        a transmit power associated with the uplink transmission being greater than the first subscriber maximum transmit power.

2. The method of claim 1, further comprising transmitting the uplink transmission at the transmit power when the transmit power is less than or equal to the first subscriber maximum transmit power.

3. The method of claim 1, wherein the first subscriber and the second subscriber are operating concurrently when at least one transmit chain of the first subscriber is active while at least one receive chain of the second subscriber is active.

4. The method of claim 3, wherein the first subscriber employs time division duplexing (TDD), the second subscriber employs TDD or frequency division duplexing (FDD), and the first subscriber and the second subscriber are either co-banded or overlap in spectrum.

5. The method of claim 1, wherein estimating the first subscriber maximum transmit power is based on a relationship between at least the second subscriber LNA input power threshold, an antenna isolation factor associated with the first subscriber and the second subscriber, or a front-end loss factor associated with the second subscriber.

6. The method of claim 5, wherein the second subscriber LNA input power threshold corresponds to an input power received at the LNA of the active second subscriber receive chain based on transmission by the active first subscriber transmit chain.

7. The method of claim 5, wherein the first subscriber is capable of uplink multiple-input multiple-output (UL-MIMO), and wherein the first subscriber maximum transmit power corresponds to each active transmit chain of the first subscriber.

8. The method of claim 5, wherein the relationship further comprises a peak-to-average power ratio.

9. An apparatus for wireless communication at a user equipment (UE), comprising:
    means for estimating a maximum transmit power for a first subscriber based on a low-noise amplifier (LNA) input power threshold associated with an active receive chain of a second subscriber, wherein the UE comprises the first subscriber and the second subscriber; and
    means for transmitting, via an active transmit chain of the first subscriber, an uplink transmission at the first subscriber maximum transmit power based on
        the first subscriber and the second subscriber operating concurrently, and
        a transmit power associated with the uplink transmission being greater than the first subscriber maximum transmit power.

10. The apparatus of claim 9, wherein the means for transmitting is further configured to transmit the uplink transmission at the transmit power when the transmit power is less than or equal to the first subscriber maximum transmit power.

11. The apparatus of claim 9, wherein the first subscriber and the second subscriber are operating concurrently when at least one transmit chain of the first subscriber is active while at least one receive chain of the second subscriber is active.

12. The apparatus of claim 11, wherein the first subscriber employs time division duplexing (TDD), the second subscriber employs TDD or frequency division duplexing (FDD), and the first subscriber and the second subscriber are either co-banded or overlap in spectrum.

13. The apparatus of claim 9, wherein the means for estimating the first subscriber maximum transmit power is based on a relationship between at least the second subscriber LNA input power threshold, an antenna isolation factor associated with the first subscriber and the second subscriber, or a front-end loss factor associated with the second subscriber.

14. The apparatus of claim 13, wherein the second subscriber LNA input power threshold corresponds to an input power received at the LNA of the active second subscriber receive chain based on transmission by the active first subscriber transmit chain.

15. The apparatus of claim 13, wherein the first subscriber is capable of uplink multiple-input multiple-output (UL-MIMO), and wherein the first subscriber maximum transmit power corresponds to each active transmit chain of the first subscriber.

16. An apparatus for wireless communication at a user equipment (UE), comprising:
    a memory; and
    at least one processor coupled to the memory and configured to:
        estimate a maximum transmit power for a first subscriber based on a low-noise amplifier (LNA) input power threshold associated with an active receive chain of a second subscriber, wherein the UE comprises the first subscriber and the second subscriber; and
        transmit, via an active transmit chain of the first subscriber, an uplink transmission at the first subscriber maximum transmit power based on
            the first subscriber and the second subscriber operating concurrently, and
            a transmit power associated with the uplink transmission being greater than the first subscriber maximum transmit power.

17. The apparatus of claim 16, wherein the at least one processor is further configured to transmit the uplink transmission at the transmit power when the transmit power is less than or equal to the first subscriber maximum transmit power.

18. The apparatus of claim 16, wherein the first subscriber and the second subscriber are operating concurrently when at least one transmit chain of the first subscriber is active while at least one receive chain of the second subscriber is active.

19. The apparatus of claim 18, wherein the first subscriber employs time division duplexing (TDD), the second subscriber employs TDD or frequency division duplexing (FDD), and the first subscriber and the second subscriber are either co-banded or overlap in spectrum.

20. The apparatus of claim 16, wherein the at least one processor is further configured to estimate the first subscriber maximum transmit power based on a relationship between at least the second subscriber LNA input power threshold, an antenna isolation factor associated with the first subscriber and the second subscriber, or a front-end loss factor associated with the second subscriber.

21. The apparatus of claim 20, wherein the second subscriber LNA input power threshold corresponds to an input power received at the LNA of the active second subscriber receive chain based on transmission by the active first subscriber transmit chain.

22. The apparatus of claim 20, wherein the first subscriber is capable of uplink multiple-input multiple-output (UL-MIMO), and wherein the first subscriber maximum transmit power corresponds to each active transmit chain of the first subscriber.

23. The apparatus of claim 20, wherein the relationship further comprises a peak-to-average power ratio.

24. A non-transitory computer-readable medium storing computer executable code for wireless communication at a user equipment (UE), the code when executed by a processor causes the processor to:
estimate a maximum transmit power for a first subscriber based on a low-noise amplifier (LNA) input power threshold associated with an active receive chain of a second subscriber, wherein the UE comprises the first subscriber and the second subscriber; and
transmit, via an active transmit chain of the first subscriber, an uplink transmission at the first subscriber maximum transmit power based on
the first subscriber and the second subscriber operating concurrently, and
a transmit power associated with the uplink transmission being greater than the first subscriber maximum transmit power.

25. The computer-readable medium of claim 24, wherein the code further causes the processor to transmit the uplink transmission at the transmit power when the transmit power is less than or equal to the first subscriber maximum transmit power.

26. The computer-readable medium of claim 24, wherein the first subscriber and the second subscriber are operating concurrently when at least one transmit chain of the first subscriber is active while at least one receive chain of the second subscriber is active.

27. The computer-readable medium of claim 26, wherein the first subscriber employs time division duplexing (TDD), the second subscriber employs TDD or frequency division duplexing (FDD), and the first subscriber and the second subscriber are either co-banded or overlap in spectrum.

28. The computer-readable medium of claim 24, wherein the code further causes the processor to estimate the first subscriber maximum transmit power based on a relationship between at least the second subscriber LNA input power threshold, an antenna isolation factor associated with the first subscriber and the second subscriber, or a front-end loss factor associated with the second subscriber.

29. The computer-readable medium of claim 28, wherein the second subscriber LNA input power threshold corresponds to an input power received at the LNA of the active second subscriber receive chain based on transmission by the active first subscriber transmit chain.

30. The computer-readable medium of claim 28, wherein the first subscriber is capable of uplink multiple-input multiple-output (UL-MIMO), and wherein the first subscriber maximum transmit power corresponds to each active transmit chain of the first subscriber.

* * * * *